United States Patent
Sato et al.

(10) Patent No.: US 10,853,128 B2
(45) Date of Patent: Dec. 1, 2020

(54) VIRTUAL MACHINE MANAGEMENT DEVICE AND VIRTUAL MACHINE MANAGEMENT METHOD

(71) Applicant: FUJITSU LIMITED, Kawasaki (JP)

(72) Inventors: Wataru Sato, Ichikawa (JP); Kenichirou Shimogawa, Numazu (JP)

(73) Assignee: FUJITSU LIMITED, Kawasaki (JP)

(*) Notice: Subject to any disclaimer, the term of this patent is extended or adjusted under 35 U.S.C. 154(b) by 94 days.

(21) Appl. No.: 16/150,313

(22) Filed: Oct. 3, 2018

(65) Prior Publication Data

US 2019/0121660 A1 Apr. 25, 2019

(30) Foreign Application Priority Data

Oct. 25, 2017 (JP) ................. 2017-206333

(51) Int. Cl.
*G06F 9/48* (2006.01)
*G06F 9/50* (2006.01)

(52) U.S. Cl.
CPC .......... *G06F 9/4856* (2013.01); *G06F 9/5077* (2013.01); *G06F 2209/503* (2013.01); *G06F 2209/5015* (2013.01)

(58) Field of Classification Search
CPC ............ G06F 9/4856; G06F 9/5077; G06F 2209/5015; G06F 2209/503; G06F 9/455–45558; G06F 9/50–5094; G06F 2009/45562; G06F 2009/45566; G06F 2009/45557; G06F 2009/45575; G06F 2009/45579; G06F 2009/45583; G06F 2009/45587; G06F 2009/45591; G06F 2009/45595

USPC ......................................................... 718/104
See application file for complete search history.

(56) References Cited

U.S. PATENT DOCUMENTS

| | | | |
|---|---|---|---|
| 8,489,744 B2* | 7/2013 | Elyashev | H04L 67/1002 709/226 |
| 8,839,263 B2* | 9/2014 | Sugai | G06F 9/45558 718/104 |
| 9,594,579 B2* | 3/2017 | Shiva | G06F 9/45533 |
| 9,600,307 B1* | 3/2017 | Pulkayath | G06F 9/45533 |
| 10,091,072 B2* | 10/2018 | Cropper | G06F 9/45558 |

(Continued)

FOREIGN PATENT DOCUMENTS

| JP | 2005-115653 | 4/2005 |
|---|---|---|
| JP | 2010-224756 | 10/2010 |
| JP | 2015-152984 | 8/2015 |

OTHER PUBLICATIONS

M. Mishra, A. Das, P. Kulkarni and A. Sahoo, "Dynamic resource management using virtual machine migrations," in IEEE Communications Magazine, vol. 50, No. 9, pp. 34-40, Sep. 2012, doi: 10.1109/MCOM.2012.6295709. (Year: 2012).*

*Primary Examiner* — Andrew M. Lyons
(74) *Attorney, Agent, or Firm* — Fujitsu Patent Center

(57) ABSTRACT

A virtual machine management device includes one or more memories, and one or more processors coupled to one or more memories and the one or more processors configured to calculate, for each of a plurality of hosts, a first amount of resources including both first resources allocated to a virtual machine migrated from a migration source and second resources available for a new virtual machine, perform selection of a first host from among the plurality of hosts in accordance with the calculated first amount, and deploy a first new virtual machine in the first host.

14 Claims, 27 Drawing Sheets

(56) References Cited

U.S. PATENT DOCUMENTS

| | | | |
|---|---|---|---|
| 10,564,998 B1* | 2/2020 | Gritter | G06N 5/04 |
| 2008/0189468 A1* | 8/2008 | Schmidt | G06F 11/203 |
| | | | 711/6 |
| 2009/0300606 A1* | 12/2009 | Miller | G06F 9/45558 |
| | | | 718/1 |
| 2011/0022681 A1* | 1/2011 | Simeonov | G06F 40/14 |
| | | | 709/217 |
| 2011/0029672 A1* | 2/2011 | Agneeswaran | G06F 9/5044 |
| | | | 709/226 |
| 2011/0161491 A1* | 6/2011 | Sekiguchi | G06F 9/4856 |
| | | | 709/224 |
| 2011/0231680 A1* | 9/2011 | Padmanabhan | G06F 1/3209 |
| | | | 713/310 |
| 2013/0311988 A1* | 11/2013 | Boss | G06F 9/4862 |
| | | | 718/1 |
| 2013/0339956 A1* | 12/2013 | Murase | G06F 9/505 |
| | | | 718/1 |
| 2014/0082165 A1* | 3/2014 | Marr | H04L 41/0806 |
| | | | 709/222 |
| 2014/0282520 A1* | 9/2014 | Sabharwal | G06F 9/455 |
| | | | 718/1 |
| 2015/0277779 A1* | 10/2015 | Devarapalli | G06F 9/45558 |
| | | | 711/162 |
| 2015/0277955 A1* | 10/2015 | Iwamatsu | G06F 9/45558 |
| | | | 718/1 |
| 2016/0105373 A1* | 4/2016 | Stephens | G06F 9/45558 |
| | | | 709/226 |
| 2016/0139946 A1* | 5/2016 | Gardner | G06F 9/5077 |
| | | | 718/1 |
| 2017/0093966 A1* | 3/2017 | Cropper | H04L 67/1025 |
| 2017/0147399 A1* | 5/2017 | Cropper | G06F 9/4856 |
| 2018/0027061 A1* | 1/2018 | Jian | H04L 67/10 |
| | | | 709/226 |
| 2018/0331973 A1* | 11/2018 | Mani | H04L 47/743 |
| 2019/0056877 A1* | 2/2019 | Kolesnik | G06F 3/0607 |

* cited by examiner

FIG. 5

HOST MANAGEMENT TABLE 35

| HOST NAME | ACTUALLY AVAILABLE RESOURCE AMOUNT | PROVISIONALLY AVAILABLE RESOURCE AMOUNT | MAINTENANCE FLAG |
|---|---|---|---|
| HOST1 | 150 | 150 | 1 |
| HOST2 | 100 | 100 | 0 |
| HOST3 | 200 | 200 | 0 |
| HOST4 | 300 | 300 | 0 |
|  |  |  |  |
|  |  |  |  |

VIRTUAL MACHINE MANAGEMENT TABLE 36

| HOST NAME | VIRTUAL MACHINE NAME | RESOURCE AMOUNT | MIGRATION FLAG | MIGRATION SOURCE HOST NAME |
|---|---|---|---|---|
| HOST1 | VM1-1 | 50 | 1 | HOST1 |
| HOST1 | VM1-2 | 50 | 1 | HOST1 |
| HOST1 | VM1-3 | 50 | 1 | HOST1 |
| HOST1 | VM1-4 | 50 | 1 | HOST1 |
| HOST1 | VM1-5 | 50 | 1 | HOST1 |
| HOST2 | VM2-1 | 100 | 0 |  |
| HOST2 | VM2-2 | 50 | 0 |  |
| HOST2 | VM2-3 | 50 | 0 |  |
| HOST2 | VM2-4 | 50 | 0 |  |
| HOST2 | VM2-5 | 50 | 0 |  |
| HOST3 | VM3-1 | 100 | 0 |  |
| HOST3 | VM3-2 | 50 | 0 |  |
| HOST3 | VM3-3 | 50 | 0 |  |
| HOST4 | VM4-1 | 50 | 0 |  |
| HOST4 | VM4-2 | 50 | 0 |  |
|  |  |  |  |  |
|  |  |  |  |  |
|  |  |  |  |  |

FIG. 12

HOST MANAGEMENT TABLE 35

| HOST NAME | ACTUALLY AVAILABLE RESOURCE AMOUNT | PROVISIONALLY AVAILABLE RESOURCE AMOUNT | MAINTENANCE FLAG |
|---|---|---|---|
| HOST1 | 150 | 150 | 1 |
| HOST2 | 0 | 100 | 0 |
| HOST3 | 50 | 200 | 0 |
| HOST4 | 300 | 300 | 0 |
| | | | |
| | | | |

VIRTUAL MACHINE MANAGEMENT TABLE 36

| HOST NAME | VIRTUAL MACHINE NAME | RESOURCE AMOUNT | MIGRATION FLAG | MIGRATION SOURCE HOST NAME |
|---|---|---|---|---|
| HOST2 | VM1-1 | 50 | 1 | HOST1 |
| HOST2 | VM1-2 | 50 | 1 | HOST1 |
| HOST3 | VM1-3 | 50 | 1 | HOST1 |
| HOST3 | VM1-4 | 50 | 1 | HOST1 |
| HOST3 | VM1-5 | 50 | 1 | HOST1 |
| HOST2 | VM2-1 | 100 | 0 | |
| HOST2 | VM2-2 | 50 | 0 | |
| HOST2 | VM2-3 | 50 | 0 | |
| HOST2 | VM2-4 | 50 | 0 | |
| HOST2 | VM2-5 | 50 | 0 | |
| HOST3 | VM3-1 | 100 | 0 | |
| HOST3 | VM3-2 | 50 | 0 | |
| HOST3 | VM3-3 | 50 | 0 | |
| HOST4 | VM4-1 | 50 | 0 | |
| HOST4 | VM4-2 | 50 | 0 | |
| | | | | |
| | | | | |
| | | | | |

FIG. 14

HOST MANAGEMENT TABLE 35

| HOST NAME | ACTUALLY AVAILABLE RESOURCE AMOUNT | PROVISIONALLY AVAILABLE RESOURCE AMOUNT | MAINTENANCE FLAG |
|---|---|---|---|
| HOST1 | 150 | 150 | 0 |
| HOST2 | 100 | 100 | 0 |
| HOST3 | 150 | 200 | 0 |
| HOST4 | 100 | 300 | 0 |
|  |  |  |  |
|  |  |  |  |

VIRTUAL MACHINE MANAGEMENT TABLE 36

| HOST NAME | VIRTUAL MACHINE NAME | RESOURCE | FLAG | MIGRATION SOURCE HOST NAME |
|---|---|---|---|---|
| HOST1 | VM1-1 | 50 | 0 |  |
| HOST1 | VM1-2 | 50 | 0 |  |
| HOST1 | VM1-3 | 50 | 0 |  |
| HOST1 | VM1-4 | 50 | 0 |  |
| HOST1 | VM1-5 | 50 | 0 |  |
| HOST2 | VM2-1 | 100 | 0 |  |
| HOST2 | VM2-2 | 50 | 0 |  |
| HOST2 | VM2-3 | 50 | 0 |  |
| HOST2 | VM2-4 | 50 | 0 |  |
| HOST2 | VM2-5 | 50 | 0 |  |
| HOST3 | VM3-1 | 100 | 0 |  |
| HOST3 | VM3-2 | 50 | 0 |  |
| HOST3 | VM3-3 | 50 | 0 |  |
| HOST4 | VM4-1 | 50 | 0 |  |
| HOST4 | VM4-2 | 50 | 0 |  |
| HOST4 | VM1 | 100 | 0 |  |
| HOST3 | VM2 | 50 | 0 |  |
| HOST4 | VM3 | 50 | 0 |  |
| HOST4 | VM4 | 50 | 0 |  |
|  |  |  |  |  |

FIG. 22

HOST MANAGEMENT TABLE 35

| HOST NAME | ACTUALLY AVAILABLE RESOURCE AMOUNT | PROVISIONALLY AVAILABLE RESOURCE AMOUNT | MAINTENANCE FLAG |
|---|---|---|---|
| HOST1 | 110 | 110 | 1 |
| HOST2 | 280 | 280 | 0 |
| HOST3 | 300 | 300 | 0 |

VIRTUAL MACHINE MANAGEMENT TABLE 36B

| HOST NAME | VIRTUAL MACHINE NAME | RESOURCE AMOUNT | MIGRATION FLAG | MIGRATION SOURCE HOST NAME | MIGRATION PREFERENTIAL ORDER |
|---|---|---|---|---|---|
| HOST1 | VM1-1 | 100 | 1 | HOST1 | 5 |
| HOST1 | VM1-2 | 80 | 1 | HOST1 | 4 |
| HOST1 | VM1-3 | 50 | 1 | HOST1 | 3 |
| HOST1 | VM1-4 | 30 | 1 | HOST1 | 1 |
| HOST1 | VM1-5 | 30 | 1 | HOST1 | 1 |
| HOST2 | VM2-1 | 60 | 0 | | |
| HOST2 | VM2-2 | 60 | 0 | | |
| HOST3 | VM3-1 | 60 | 0 | | |
| HOST3 | VM3-2 | 40 | 0 | | |

VIRTUAL MACHINE MANAGEMENT DEVICE AND VIRTUAL MACHINE MANAGEMENT METHOD

CROSS-REFERENCE TO RELATED APPLICATION

This application is based upon and claims the benefit of priority of the prior Japanese Patent Application No. 2017-206333, filed on Oct. 25, 2017, the entire contents of which are incorporated herein by reference.

FIELD

The embodiments discussed herein are related to a virtual machine management technology.

BACKGROUND

An information processing system used in cloud service includes a plurality of servers at which virtual machines are deployed, and a management device configured to manage the deployment of the virtual machines. In a technology, for example, the management device classifies, based on the temporal use status of resources at the servers and the virtual machines, each virtual machine into a virtual machine for which it is possible to predict the amount of resources to be used or a virtual machine for which it is impossible to predict the amount of resources to be used. Then, the management device determines, based on a result of the classification, virtual machines to be deployed at the servers again to equalize loads on the servers for each classification.

In another technology, the management device periodically checks whether servers are likely to become a high-load state based on a schedule of loads due to virtual machines that is acquired from schedule information on usage of the virtual machines, and periodically measured values of the loads due to the virtual machines. Then, when the servers are likely to become the high-load state, the management device deploys the virtual machines at the servers again before the servers become the high-load state.

In another technology, the management device calculates a combined of virtual machines and servers for achieving maximum performance based on measured data indicating the performance of each virtual machine, data related to the storage capacity of a server at which the virtual machine is operated, and data related to the storage capacity of the virtual machine. Then, the management device deploys the virtual machines at the servers in accordance with the calculated combination.

For example, related arts are disclosed in Japanese Laid-open Patent Publication No. 2015-152984, Japanese Laid-open Patent Publication No. 2010-224756 and Japanese Laid-open Patent Publication No. 2005-115653.

SUMMARY

According to an aspect of the embodiments, a virtual machine management device includes one or more memories, and one or more processors coupled to one or more memories and the one or more processors configured to calculate, for each of a plurality of hosts, a first amount of resources including both first resources allocated to a virtual machine migrated from a migration source and second resources available for a new virtual machine, perform selection of a first host from among the plurality of hosts in accordance with the calculated first amount, and deploy a first new virtual machine in the first host.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating examples of a host management table and a virtual machine management table illustrated in FIG. 3;

FIG. 12 is a diagram illustrating the states of a host management table and a virtual machine management table for (C) of FIG. 11;

FIG. 14 is a diagram illustrating the states of the host management table and the virtual machine management table for (F) of FIG. 13;

FIG. 22 is a diagram illustrating examples of a host management table and a virtual machine management table illustrated in FIG. 21;

DESCRIPTION OF EMBODIMENTS

In a conventional technology, when maintenance is performed at any of a plurality of servers at which virtual machines are deployed, a management device temporarily migrates any virtual machine deployed at the server at which the maintenance is to be performed to another server. When having received a request for activation of a new virtual machine before the maintenance of the server is completed, the management device deploys the new virtual machine at any deployment destination server except for the server under the maintenance. In this case, the management device preferentially deploys the virtual machine at a server, the amount of available resources of which is larger than those of the other hosts to equalize the amount of resources used for virtual machines between the servers. Accordingly, the management device equalizes loads on the servers by deploying virtual machines at the plurality of servers in a distributed manner.

A virtual machine migrated to a deployment destination server due to the maintenance is returned to the original server after the maintenance ends. After the virtual machine is returned to the original server, the amount of available resources at the servers is larger as a larger amount of resources are used by the virtual machine returned to the original server. Thus, after the migrated virtual machine is returned to the original server, variance in the amount of resources available for deployment of virtual machines potentially occurs between the servers, and accordingly, loads on the servers are not equalized in some cases.

Embodiments will be described below with reference to the accompanying drawings.

Figure 1:
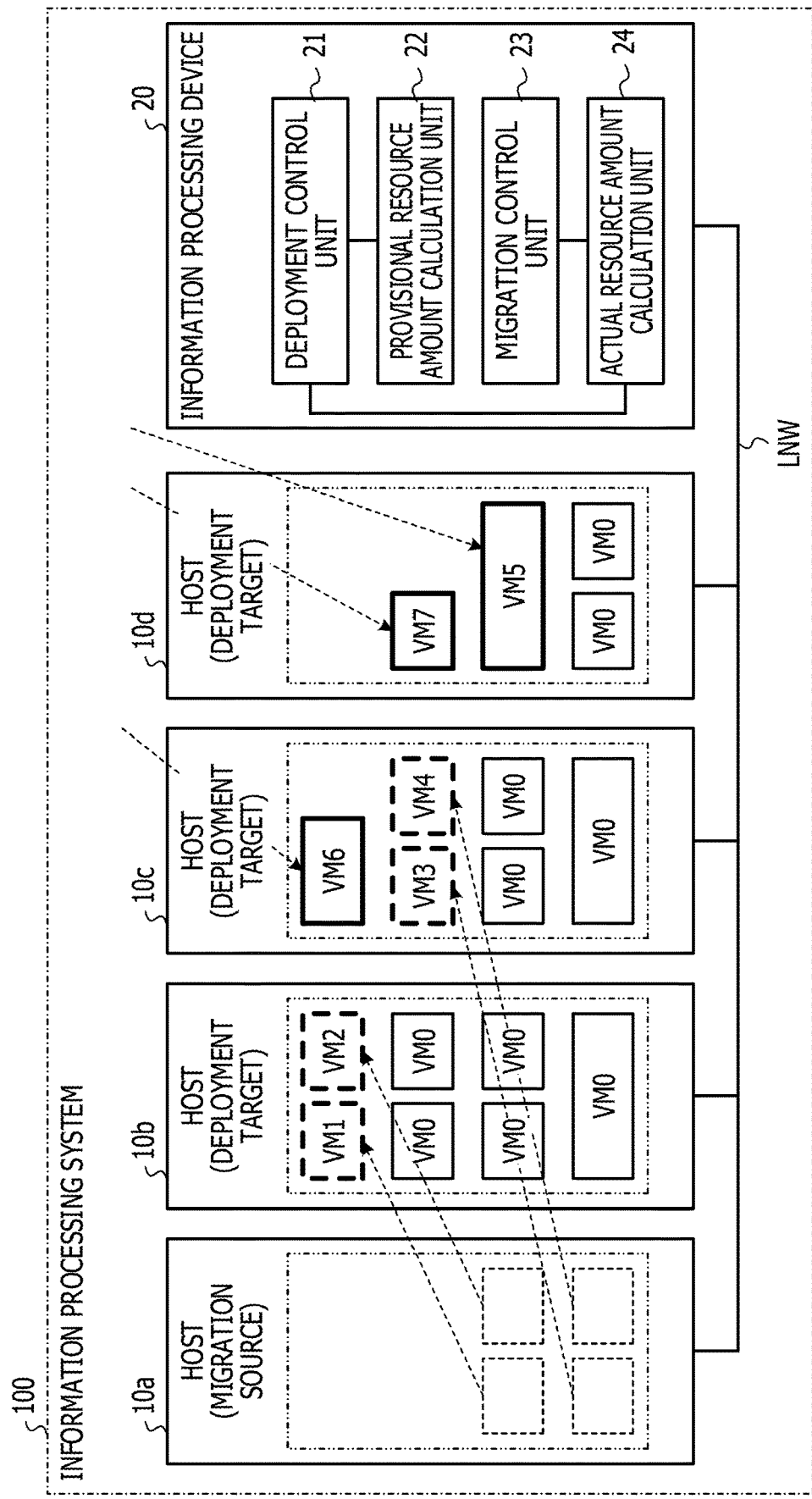
FIG. 1 is a diagram illustrating an information processing device, an information processing system, and an information processing method according to an embodiment.

FIG. 1 illustrates an information processing device, an information processing system, and an information processing method according to an embodiment. This information processing system 100 illustrated in FIG. 1 is used for, for example, a cloud computing service configured to provide computer resources through a network. The information processing system 100 may be applied to usage other than a cloud computing service.

The information processing system 100 includes a plurality of hosts 10 (10a, 10b, 10c, and 10d) at which virtual machines VM are deployed, and an information processing device 20 configured to control deployment of the virtual machines VM to the hosts 10. The hosts 10 and the information processing device 20 are mutually connected through a network LNW. For example, the hosts 10 are processing servers configured to execute data processing by using the virtual machines VM, and the information processing device 20 is a management server configured to manage the processing servers.

The information processing device 20 includes a deployment control unit 21, a provisional resource amount calculation unit 22, a migration control unit 23, and an actual resource amount calculation unit 24. The deployment control unit 21, the provisional resource amount calculation unit 22, the migration control unit 23, and the actual resource amount calculation unit 24 are achieved by a processor, such as a central processing unit (CPU) included in the information processing device 20, executing a plurality of instructions included in a control program for controlling deployment of a virtual machine VM. The deployment control unit 21, the provisional resource amount calculation unit 22, the migration control unit 23, and the actual resource amount calculation unit 24 may be achieved by hardware such as a field-programmable gate array (FPGA) included in the information processing device 20.

For example, when maintenance of the host 10a is performed, virtual machines VM (VM1 to VM4) deployed at the host 10a are migrated to the other hosts 10b, 10c, and 10d by a method such as live migration. The host 10a is an exemplary migration source host. The maintenance is performed to update an operating system (OS) executed by the host 10a, update virtualization software that controls activation of the virtual machines VM on the host 10a, or replace various components included in the host 10a.

The hosts 10b, 10c, and 10d are deployment destination hosts at which new virtual machines VM (VM5 to VM7) are deployed during the maintenance of the host 10a. The virtual machines VM1 to VM4 are migrated from the host 10a before the maintenance of the host 10a. When maintenance is performed at any one of the four hosts 10, the remaining three hosts 10 on which maintenance is not performed are deployment destination hosts. The number of hosts 10 included in the information processing system 100 is not limited to four.

The provisional resource amount calculation unit 22 assumes that the resources of the virtual machines VM1 to VM4 migrated from the host 10a are unused at the hosts 10b, 10c, and 10d to which virtual machines VM are to be deployed. Then, the provisional resource amount calculation unit 22 calculates a provisional available resource amount as the amount of resources available for deployment of new virtual machines VM based on unused resources including the resources of the virtual machines VM1 to VM4. The amount of resources is determined based on, for example, the number of CPU cores configured to activate virtual machines VM, and the capacities of memories used by the virtual machines VM.

The deployment control unit 21 sequentially deploys the new virtual machines VM5 to VM7 at the host 10, the provisional available resource amount of which is largest among the deployment destination hosts 10b, 10c, and 10d based on the provisionally available resource amounts calculated by the provisional resource amount calculation unit 22. The deployment control unit 21 avoids deployment of the virtual machines VM to any host 10 for which an actually available resource amount as the amount of actually available resources is smaller than the amount of resources used for the virtual machines VM. In other words, after having determined that deployment of the virtual machines VM is possible based on the actually available resource amount, the deployment control unit 21 determines whether deployment of the virtual machines VM is possible based on the provisionally available resource amount. Accordingly, when the virtual machines VM are deployed at the host 10, the provisionally available resource amount of which is larger than those of the other hosts, it is possible to avoid overcommitment that the virtual machines VM are deployed at the host 10 beyond the amount of physical resources. Thus, it is possible to avoid degradation of the processing performance of the virtual machines VM due to the overcommitment.

The migration control unit 23 sequentially migrates the virtual machines VM1 to VM4 to the host 10, the actually available resource amount of which is smallest among the hosts 10b, 10c, and 10d based on the actually available resource amounts calculated by the actual resource amount calculation unit 24. The actual resource amount calculation unit 24 calculates the actually available resource amounts of the hosts 10b, 10c, and 10d to which the virtual machines VM are to be deployed.

In the example illustrated in FIG. 1, the virtual machines VM1 to VM7 are migrated or newly deployed in the order of the trailing numbers of the reference signs thereof. Virtual machines VM0 are already deployed at the hosts 10b, 10c, and 10d by the deployment control unit 21 before the virtual machines VM1 to VM7 are migrated or deployed. The size of a rectangle illustrating each virtual machine VM relatively indicates the amount of resources used for the virtual machine VM.

The virtual machines VM1 to VM4 deployed at the host 10a are sequentially migrated to the hosts 10 having smaller amounts of available resources among the hosts 10b, 10c, and 10d by the migration control unit 23 before the maintenance of the host 10a. Rectangles illustrated with bold dashed lines indicate the virtual machines VM1 to VM4 migrated from the host 10a. Hereinafter, the method of preferentially migrating a virtual machine VM to a host 10 having a smaller amount of available resources is referred to as a stuffing method.

When a virtual machine VM is migrated by the stuffing method, the amount of available resources at a host 10 to which the virtual machine VM is not migrated is larger than the amount of available resources of a host 10 to which the virtual machine VM is migrated. In other words, some amounts of available resources are obtained at any of the hosts 10. Accordingly, a new virtual machine VM is deployed at a higher probability than a case in which virtual machines VM are equally migrated to a plurality of hosts 10 to equally distribute available resources at the plurality of hosts 10.

In FIG. 1, the migration control unit 23 migrates the virtual machine VM1 to the host 10b, the actually available resource amount of which is smallest among the hosts 10b, 10c, and 10d to which it is possible to migrate the virtual machine VM1. After the virtual machine VM1 is migrated to the host 10b, the actual resource amount calculation unit 24 calculates the actually available resource amount of the host 10b based on an instruction from the migration control unit 23. The actually available resource amount of the host 10b is reduced by the amount of resources used for the virtual machine VM1.

Subsequently, the migration control unit 23 migrates the virtual machine VM2 to the host 10b, the actually available resource amount of which is smallest among the hosts 10b, 10c, and 10d to which it is possible to migrate the virtual machine VM2. After the virtual machine VM2 is migrated to the host 10b, the actual resource amount calculation unit 24 calculates the actually available resource amount of the host 10b based on an instruction from the migration control unit 23.

The newly calculated actually available resource amount of the host 10b is smaller than the amount of resources used for migration of the virtual machine VM3. Accordingly, the migration control unit 23 determines that the hosts 10c and 10d are hosts to which it is possible to migrate the virtual machine VM3, and migrates the virtual machine VM3 to the host 10c, the actually available resource amount of which is smallest among the hosts 10c and 10d. The actual resource amount calculation unit 24 calculates, based on an instruction from the migration control unit 23, the actually available resource amount of the host 10b to which the virtual machine VM3 is migrated.

Subsequently, the migration control unit 23 migrates the virtual machine VM4 to the host 10c, the actually available resource amount of which is smallest among the hosts 10c and 10d to which it is possible to migrate the virtual machine VM4. The actual resource amount calculation unit 24 calculates the actually available resource amount of the host 10c to which the virtual machine VM4 is migrated based on an instruction from the migration control unit 23. This completes migration of the virtual machines VM1 to VM4 deployed at the host 10a to the hosts 10b and 10c.

The provisionally available resource amounts of the hosts 10b, 10c, and 10d are equal to the actually available resource amounts of the hosts 10b, 10c, and 10d before the virtual machines VM1 to VM7 are deployed, and are calculated in advance by the provisional resource amount calculation unit 22. The provisionally available resource amounts are calculated irrespective of the amount of resources used for the virtual machines VM migrated to the hosts 10, and thus do not change through migration of the virtual machines VM1 to VM4 to the hosts 10b and 10c.

After the virtual machines VM1 to VM4 are completely migrated to the hosts 10b and 10c by the migration control unit 23, the new virtual machines VM5 to VM7 indicated by rectangles illustrated with bold solid lines are sequentially deployed to any of the hosts 10b, 10c, and 10d by the deployment control unit 21 as describes below. The deployment of the new virtual machines VM5 to VM7 to the hosts 10 by the deployment control unit 21 may be executed during the migration of the virtual machines VM1 to VM4 to the hosts 10 by the migration control unit 23.

After the virtual machines VM1 to VM4 are migrated to the hosts 10b and 10c, the provisionally available resource amounts of the hosts 10d, 10c, and 10b are larger in the stated order. Since the actually available resource amount of the host 10b is smaller than the amount of resources at any of the virtual machines VM5 to VM7, the deployment control unit 21 excludes the host 10b as a host at which the virtual machines VM5 to VM7 are to be deployed. Then, the deployment control unit 21 deploys the virtual machine VM5 at the host 10d, the provisionally available resource amount of which is largest among the hosts 10c and 10d at which it is possible to deploy the virtual machine VM5. Hereinafter, the method of preferentially migrating a virtual-machine VM to a host 10 at which the amount of available resources is large is referred to as a load balance method.

After the virtual machine VM5 is deployed at the host 10d, the provisional resource amount calculation unit 22 calculates the provisionally available resource amount of the host 10d based on an instruction from the deployment control unit 21. The actual resource amount calculation unit 24 also calculates the actually available resource amount of the host 10d based on an instruction from the deployment control unit 21. The provisionally available resource amount and the actually available resource amount are each reduced by the amount of resources used for deployment of the virtual machine VM5.

After the virtual machine VM5 is deployed at the host 10d, the provisionally available resource amounts of the hosts 10c, 10d, and 10b are larger in the stated order. Thus, the deployment control unit 21 deploys the virtual machine VM6 at the host 10c, the provisionally available resource amount of which is largest among the hosts 10c and 10d at which it is possible to deploy the virtual machine VM6.

After the virtual machine VM6 is deployed at the host 10c, the provisional resource amount calculation unit 22 calculates the provisionally available resource amount of the host 10c based on an instruction from the deployment control unit 21. The actual resource amount calculation unit 24 also calculates the actually available resource amount of the host 10c based on an instruction from the deployment control unit 21.

For example, when the virtual machines VM3 and VM4 are temporarily migrated to the host 10c, the provisionally available resource amount of which is calculated, the provisional resource amount calculation unit 22 calculates the provisionally available resource amount to be an available resource amount calculated by assuming that the amount of resources used for the virtual machines VM3 and VM4 is zero. In other words, the provisional resource amount calculation unit 22 calculates the provisionally available resource amount of the host 10c by assuming that resources used for the virtual machines VM3 and VM4 migrated from the host 10a are unused. The provisional resource amount calculation unit 22 receives, from the migration control unit 23 at each migration of the virtual machines VM1 to VM4, information indicating a migration destination host 10 of each of the virtual machines VM1 to VM4 and the amount of resources used for each of the virtual machines VM1 to VM4.

After the virtual machine VM6 is deployed at the host 10c, the provisionally available resource amounts of the hosts 10d, 10c, and 10b are larger in the stated order. Since the actually available resource amounts of the hosts 10b and 10c are smaller than the amount of resources used for the virtual machine VM7, the hosts 10b and 10c are excluded as a host at which the virtual machine VM7 is to be deployed. Thus, the deployment control unit 21 deploys the virtual machine VM7 at the host 10d. In this manner, the deployment control unit 21 avoids deployment of a virtual machine VM to a host 10, the actually available resource amount of which is insufficient, when deployment of virtual machines VM is possible based on the provisionally available resource amount. Accordingly, it is possible to avoid overcommitment that occurs when the virtual machine VM7 is deployed at the host 10c, and thus to avoid degradation of the processing performance of virtual machines VM due to the overcommitment.

After the virtual machine VM7 is deployed at the host 10d, the provisional resource amount calculation unit 22 calculates the provisionally available resource amount of the host 10d based on an instruction from the deployment control unit 21. The actual resource amount calculation unit 24 also calculates the actually available resource amount of the host 10d based on an instruction from the deployment control unit 21.

Figure 2:
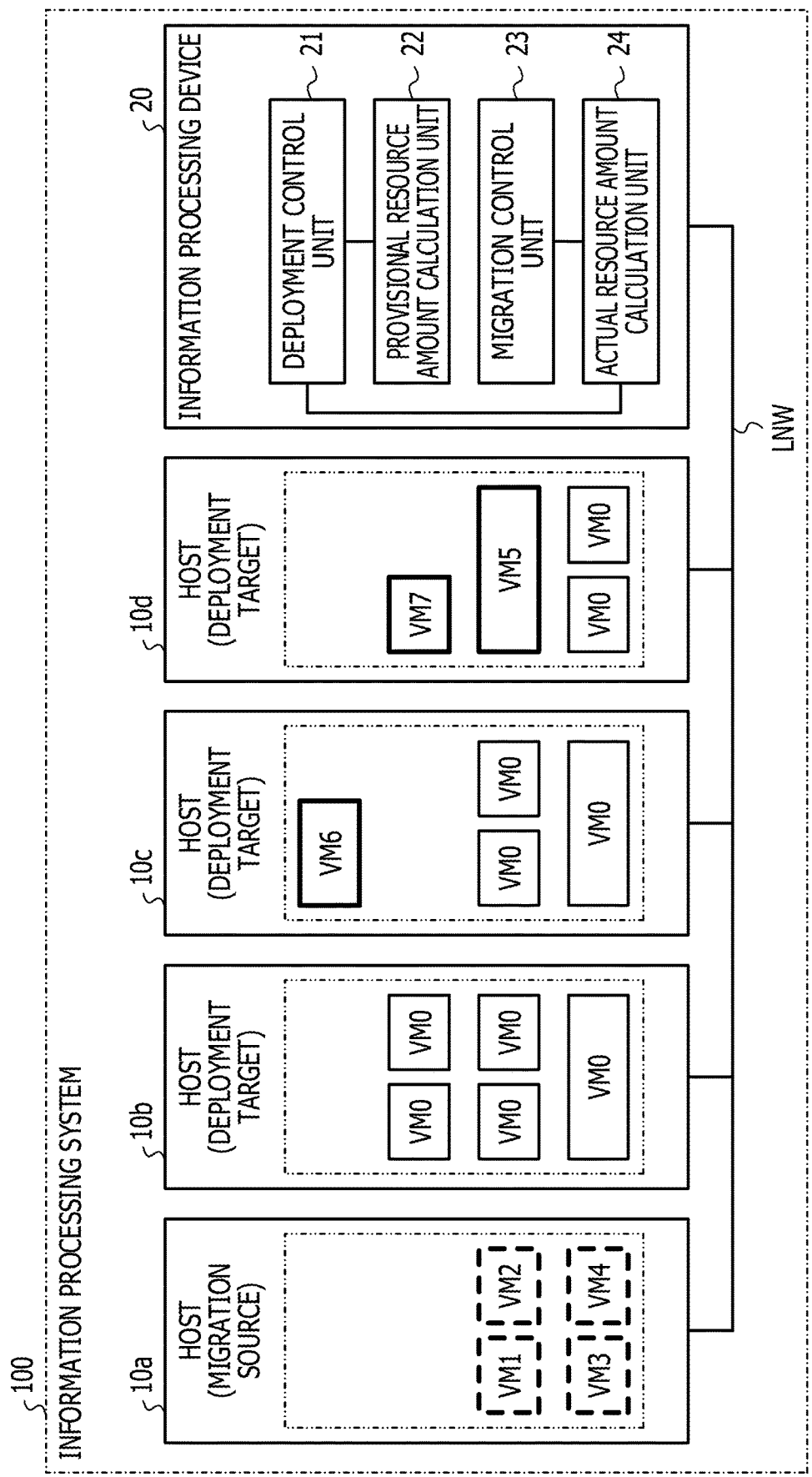
FIG. 2 is a diagram illustrating a state in which a migrated virtual machine is returned to a migration source host in the information processing system illustrated in FIG. 1.

FIG. 2 illustrates a state in which the migrated virtual machines VM1 to VM4 are returned to the migration source host 10a in the information processing system 100 illustrated in FIG. 1. The processing of returning the virtual machines VM1 to VM4 to the migration source host 10a is executed by, for example, the migration control unit 23. After the virtual machines VM1 to VM4 is returned to the migration source host 10a, the amounts of resources used for virtual machines VM deployed at the deployment destination hosts 10b, 10c, and 10d are substantially same as each other.

Specifically, when new virtual machines VM are sequentially deployed at the host 10, the provisionally available resource amount of which is largest among the hosts 10b, 10c, and 10d, loads on the hosts 10b, 10c, and 10d are equalized after the virtual machines VM are returned to the migration source host 10a. In other words, it is possible to avoid variance in the efficiency of access to memories or disk devices by the virtual machines VM between the hosts 10b, 10c, and 10d after the virtual machines VM are returned to the migration source host 10a. As a result, it is possible to avoid variance in the processing performance of the hosts 10b, 10c, and 10d.

As described above, in the embodiment illustrated in FIGS. 1 and 2, when a new virtual machine VM is deployed at a host 10 to which a virtual machine VM is migrated from another host 10, the new virtual machine VM is deployed at a host 10, the provisionally available resource amount of which is larger than those of the other hosts. Accordingly, it is possible to equalize the available resource amounts of the hosts 10 after the virtual machine VM is returned to the migration source host 10, and thus to equalize loads on the hosts 10.

When a virtual machine VM is migrated by the stuffing method and a new virtual machine VM is deployed by the load balance method based on actually available resource amounts, the new virtual machine VM is likely to be deployed with concentration to a host 10 to which the virtual machine VM is not migrated. In this case, the available resource amounts of hosts 10 after virtual machines VM are returned to the migration source host 10 are not equalized. However, in the embodiment illustrated in FIGS. 1 and 2, when a virtual machine VM is migrated by the stuffing method, a new virtual machine VM is deployed by the load balance method based on provisionally available resource amounts. Accordingly, when variance occurs in the actually available resource amounts of hosts 10 through migration of a virtual machine VM by the stuffing method, it is possible to equalize the available resource amounts of the hosts 10 after the virtual machine VM is returned to the migration source host 10.

In addition, when a virtual machine VM is deployed at a host 10, the provisionally available resource amount of which is larger than those of the other hosts, it is possible to avoid deployment of the virtual machine VM to a host 10, the actually available resource amount of which is smaller than the amount of resources used for the virtual machine VM, thereby avoiding overcommitment. Accordingly, it is possible to avoid degradation of the processing performance of the virtual machine VM due to overcommitment.

When a virtual machine VM is migrated by the stuffing method, the amount of available resources at a host 10 to which the virtual machine VM is not migrated is larger than the amount of available resources at a host 10 to which the virtual machine VM is migrated. Accordingly, a new virtual machine VM is deployed at a higher probability than a case in which available resources are equally distributed at a plurality of hosts 10 at migration of a virtual machine VM.

Figure 3:
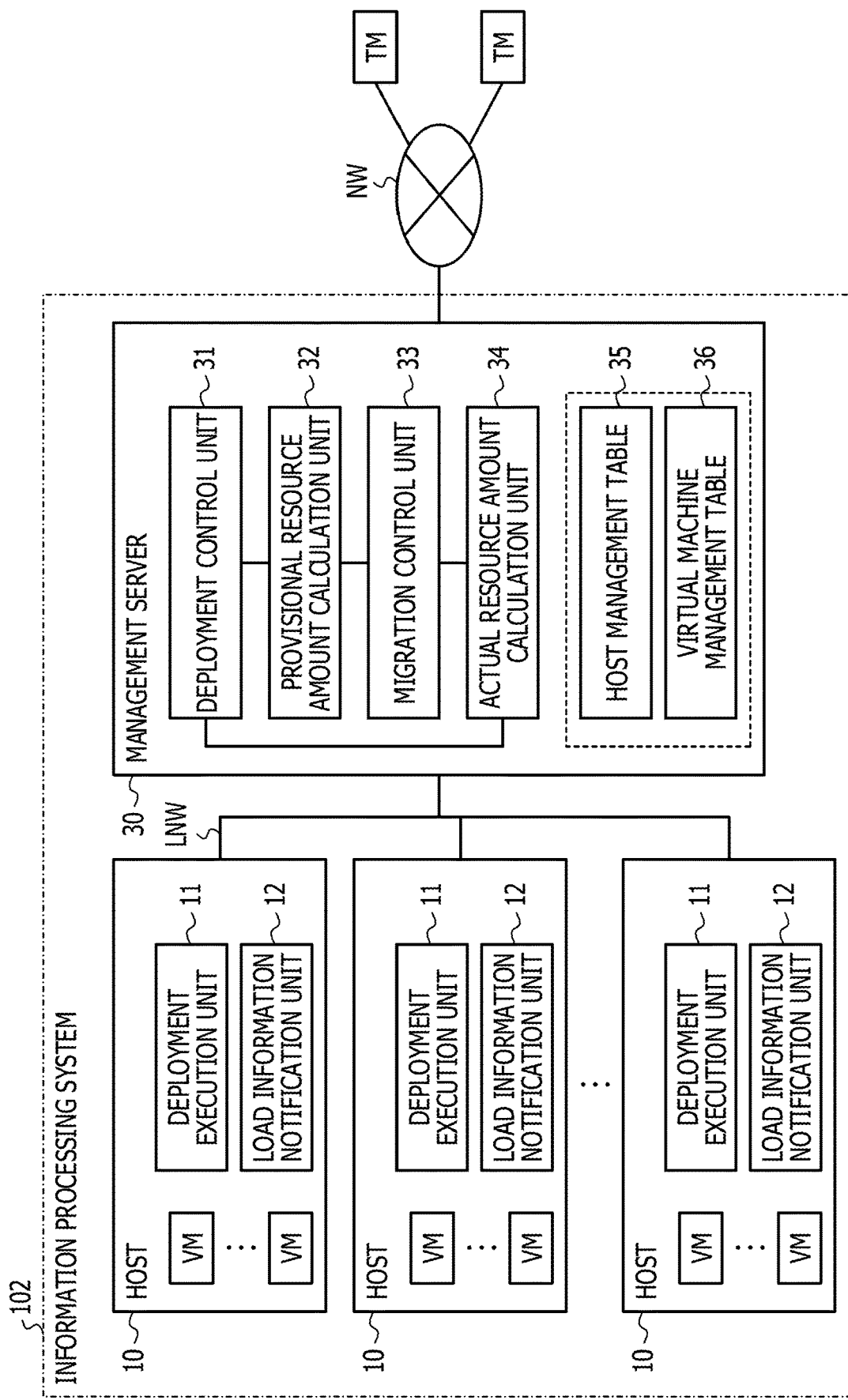
FIG. 3 is a diagram illustrating an information processing device, an information processing system, and an information processing method according to another embodiment.

FIG. 3 illustrates an information processing device, an information processing system, and an information processing method according to another embodiment. Detailed description of any component identical or equivalent to that of the information processing system 100 illustrated in FIG. 1 will be omitted. Similarly to the information processing system 100 illustrated in FIG. 1, an information processing system 102 illustrated in FIG. 3 is used for, for example, a cloud computing service configured to provide computer resources through a network.

The information processing system 102 includes a plurality of hosts 10 at which deployment of virtual machines VM is possible, and a management server 30 configured to control deployment of the virtual machines VM at the hosts 10. The management server 30 is an exemplary information processing device configured to control deployment of virtual machines VM to a plurality of hosts 10. The hosts 10 and the management server 30 are mutually connected through the network LNW. Each host 10 includes a deployment execution unit 11 configured to deploy or delete a virtual machine VM based on an instruction from the management server 30, and a load information notification unit 12 configured to notify the management server 30 of a load due to a deployed virtual machine VM.

The management server 30 is connected with a terminal device TM through a network NW such as the Internet or an intranet. The management server 30 executes control to deploy a new virtual machine VM at a host 10 or executes control to delete a virtual machine VM deployed at a host 10 based on an instruction from the terminal device TM operated by a user who uses the virtual machine VM for data processing or the like.

The management server 30 includes a deployment control unit 31, a provisional resource amount calculation unit 32, a migration control unit 33, an actual resource amount calculation unit 34, a host management table 35, and a virtual machine management table 36. The deployment control unit 31, the provisional resource amount calculation unit 32, the migration control unit 33, and the actual resource amount calculation unit 34 are achieved by a processor, such as a CPU included in the management server 30, executing a plurality of instructions included in a control program for controlling deployment of a virtual machine VM. The deployment control unit 31, the provisional resource amount calculation unit 32, the migration control unit 33, and the actual resource amount calculation unit 34 may be achieved by hardware such as a FPGA included in the management server 30.

Figure 6:
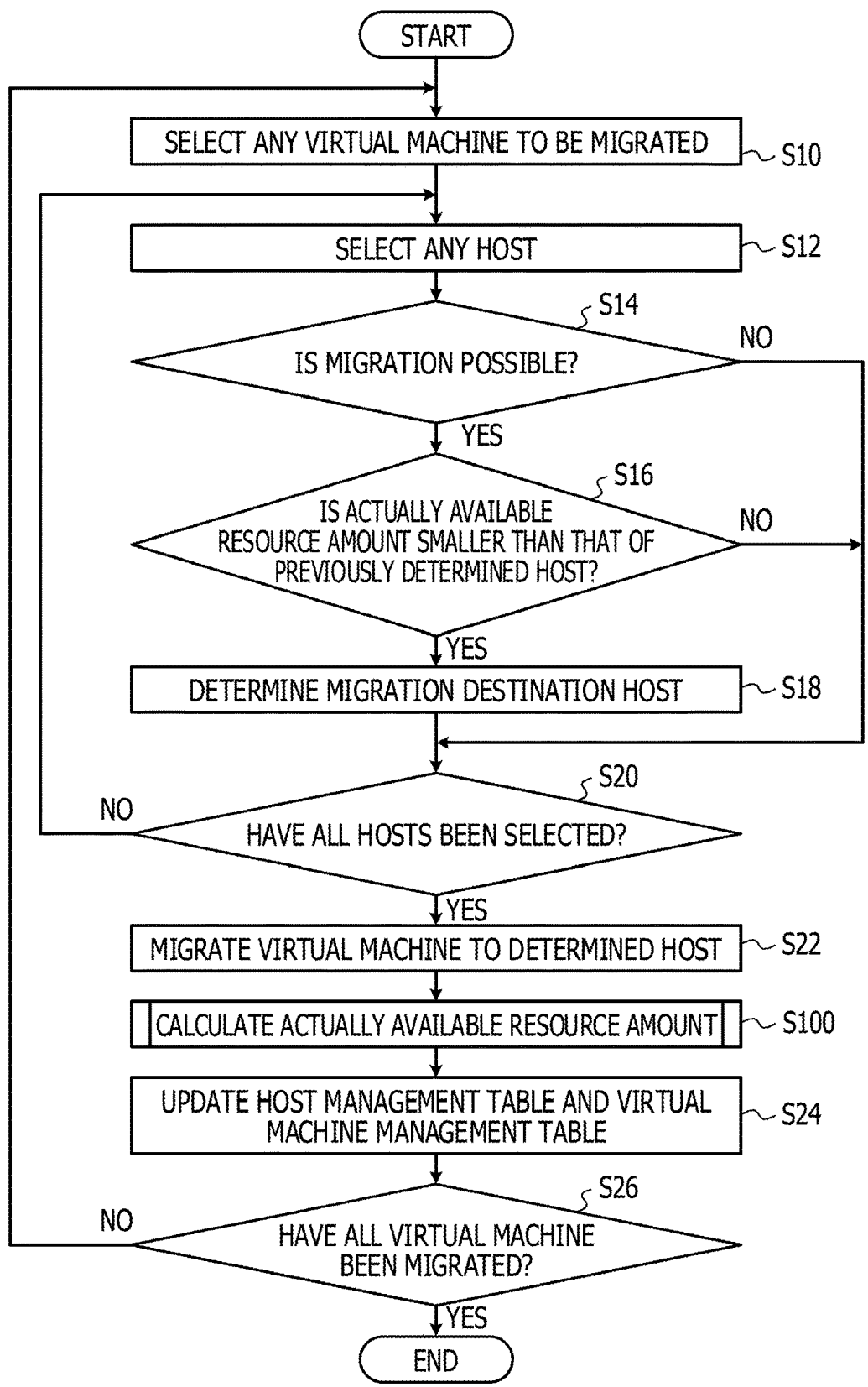
FIG. 6 is a diagram illustrating an exemplary operation of migrating a virtual machine in the management server illustrated in FIG. 3.
Figure 7:
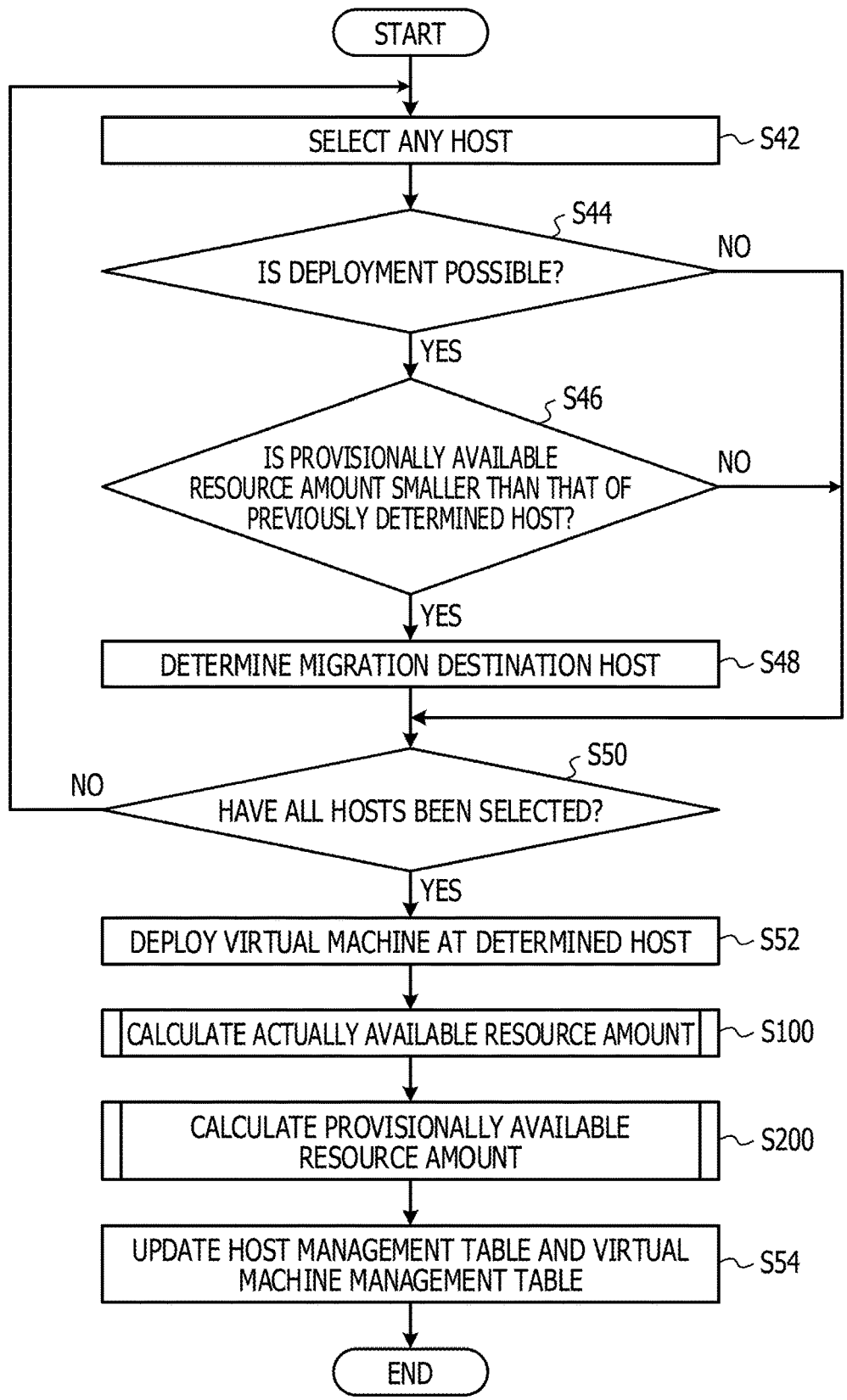
FIG. 7 is a diagram illustrating an exemplary operation of deploying a new virtual machine to a host in the management server illustrated in FIG. 3.
Figure 8:
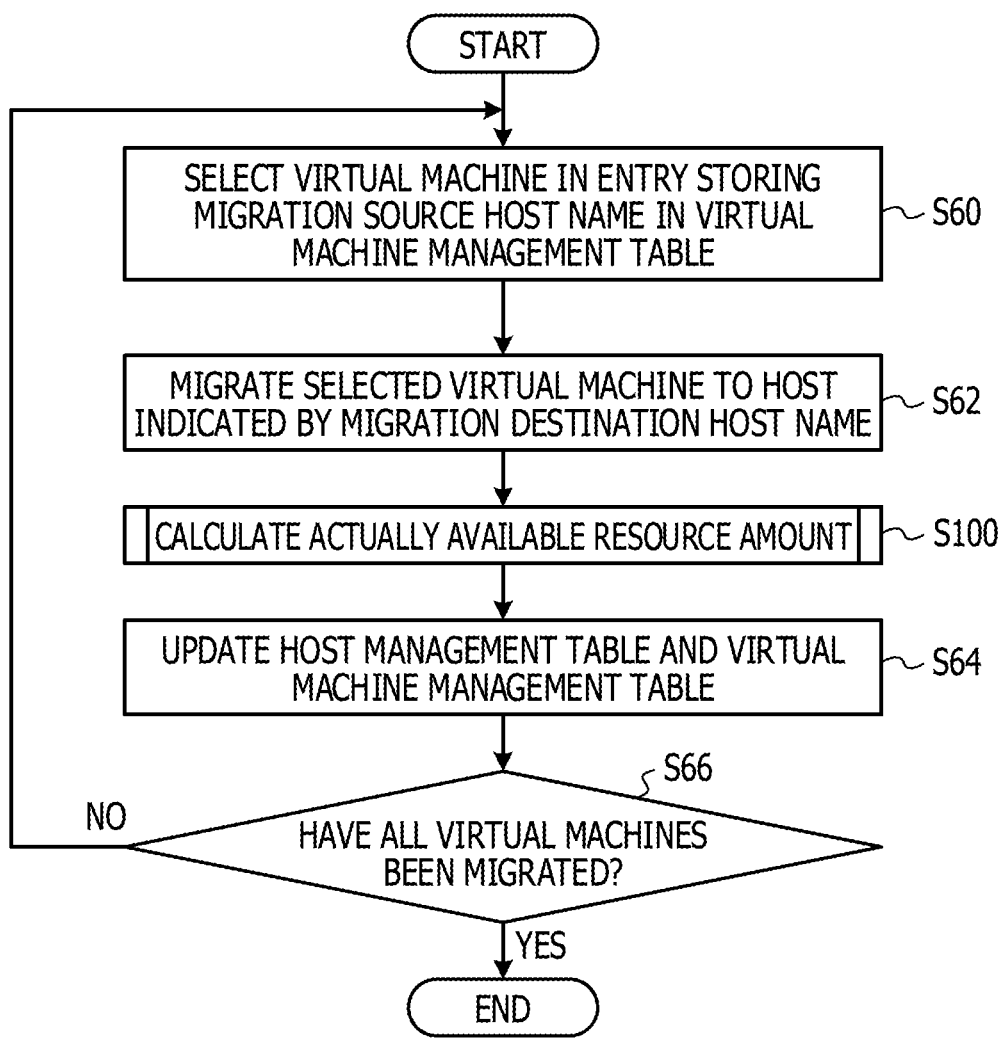
FIG. 8 is a diagram illustrating an exemplary operation of returning a virtual machine to a migration source host in the management server illustrated in FIG. 3.
Figure 9:
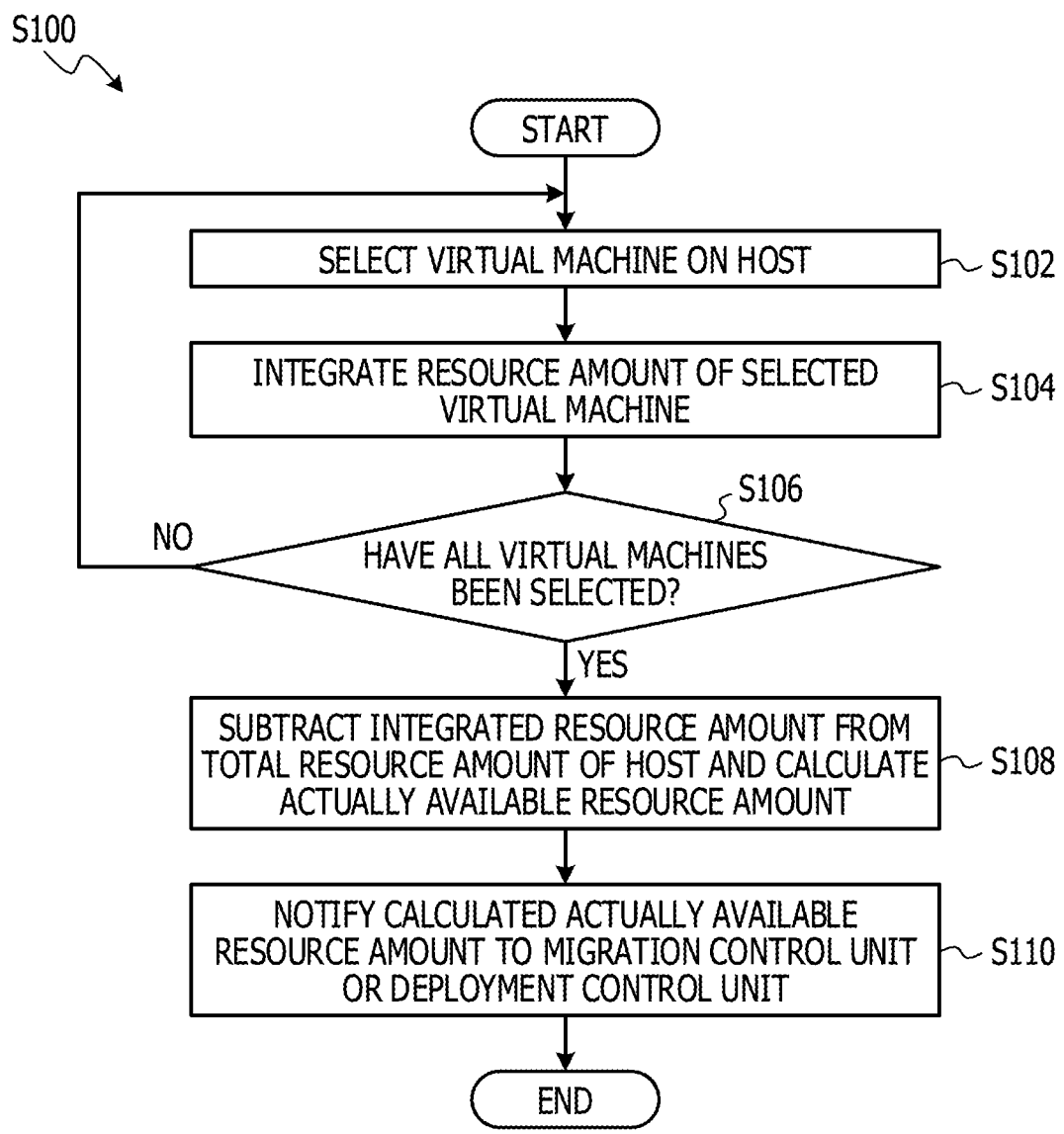
FIG. 9 is a diagram illustrating an exemplary operation at step S100 illustrated in FIGS. 6, 7, and 8.
Figure 10:
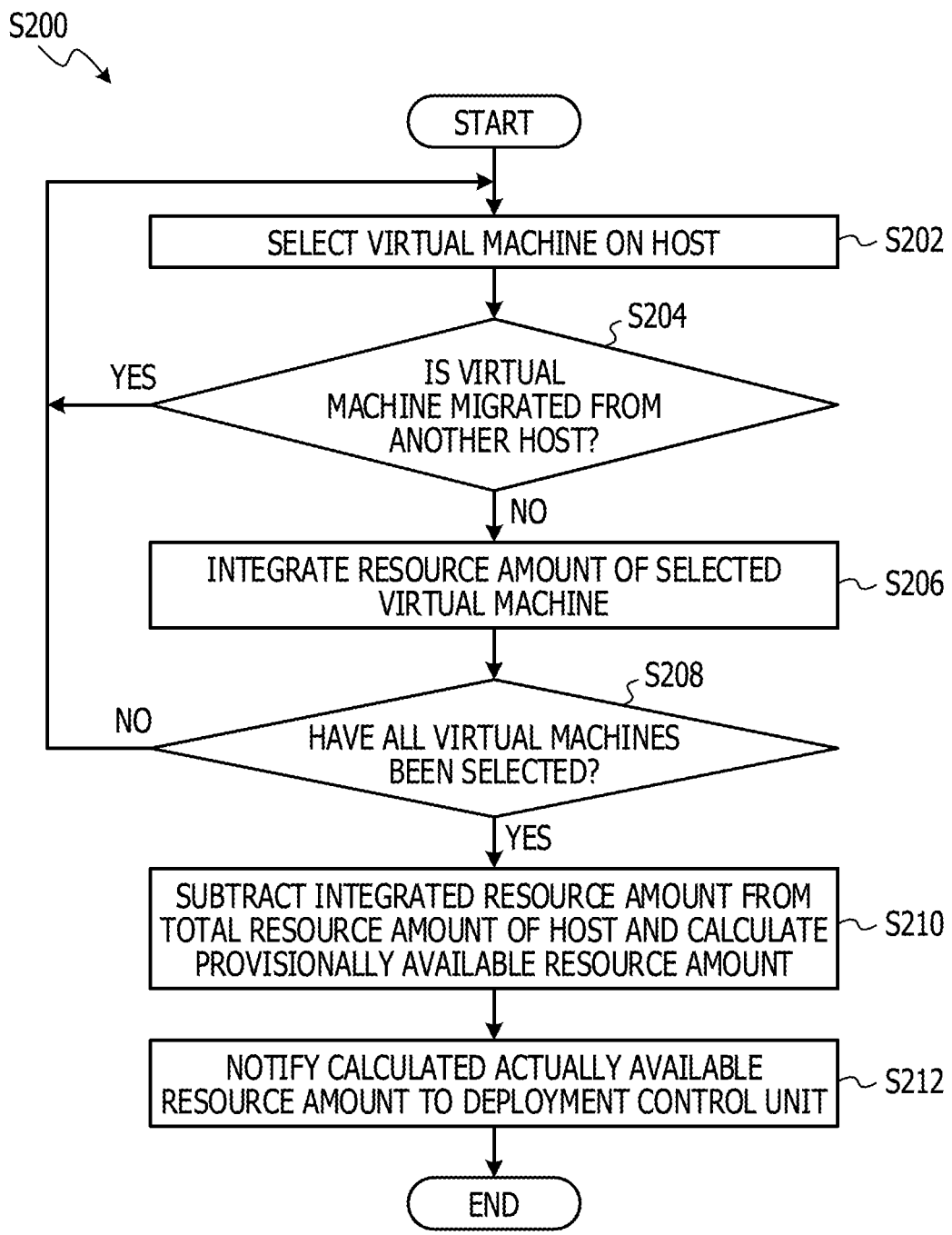
FIG. 10 is a diagram illustrating an exemplary operation at step S200 illustrated in FIG. 7.

The deployment control unit 31 has functions same as those of the deployment control unit 21 illustrated in FIG. 1 except that the deployment control unit 31 controls deployment of a virtual machine VM by using the host management table 35 and the virtual machine management table 36. FIG. 7 illustrates an exemplary operation of the deployment control unit 31. The provisional resource amount calculation unit 32 has functions same as those of the provisional resource amount calculation unit 32 illustrated in FIG. 1. FIG. 10 illustrates an exemplary operation of the provisional resource amount calculation unit 32. The migration control unit 33 has functions same as those of the migration control unit 23 illustrated in FIG. 1 except that the migration control unit 33 controls migration of a virtual machine VM by using the host management table 35 and the virtual machine management table 36. FIGS. 6 and 8 illustrate an exemplary operation of the migration control unit 33. The actual resource amount calculation unit 34 has functions same as those of the actual resource amount calculation unit 24 illustrated in FIG. 1. FIG. 9 illustrates an exemplary operation of the actual resource amount calculation unit 34.

The host management table 35 and the virtual machine management table 36 are allocated to, for example, a memory such as a synchronous dynamic random access memory (SDRAM) or a flash memory included in the management server 30. FIG. 5 illustrates examples of the host management table 35 and the virtual machine management table 36.

Figure 4:
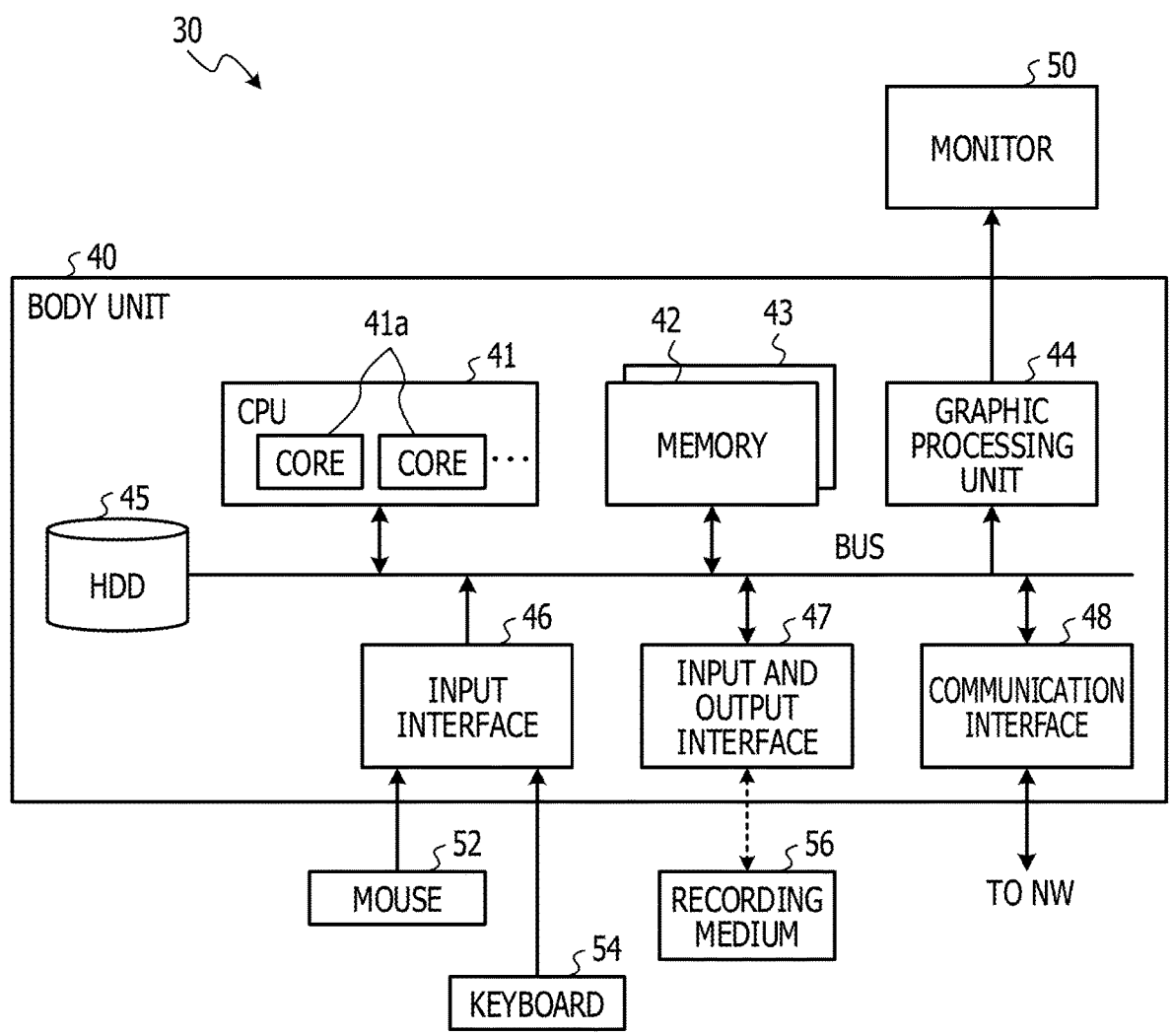
FIG. 4 is a diagram illustrating an exemplary hardware configuration of a management server illustrated in FIG. 3.

FIG. 4 illustrates an exemplary hardware configuration of the management server 30 illustrated in FIG. 3. Each host 10 illustrated in FIG. 3 has a configuration identical or equivalent to that illustrated in FIG. 4. The management server 30 includes a body unit 40 such as a motherboard, and a monitor 50, a mouse 52, and a keyboard 54 connected with the body unit 40. The body unit 40 includes a CPU 41, memories 42 and 43, a graphic processing unit 44, a hard disk drive (HDD) 45, an input interface 46, an input and output interface 47, and a communication interface 48, which are connected with each other through a bus BUS. The body unit 40 may include a FPGA.

The CPU 41 includes a plurality of cores 41a configured to execute arithmetic processing. The body unit 40 may include a plurality of CPUs 41. Any of the cores 41a executes a plurality of instructions included in a control program for controlling deployment of a virtual machine VM to achieve functions of the deployment control unit 31, the provisional resource amount calculation unit 32, the migration control unit 33, and the actual resource amount calculation unit 34, which are illustrated in FIG. 3. When the body unit 40 includes a plurality of CPUs 41, the control program may be executed by any of the plurality of CPUs 41.

For example, the memory 42 is a memory module on which a plurality of SDRAMs is mounted, and the memory 43 is a flash memory. The cores 41a and the memory 42 are used as physical resources for operating a virtual machine VM. The graphic processing unit 44 outputs, for example, image data to be displayed on the monitor 50 to the monitor 50 based on an instruction from the CPU 41. The HDD 45 holds various computer programs executed by the CPU 41. The CPU 41 executes the various computer programs forwarded from the HDD 45 to the memory 42.

The input interface 46 transmits, to the CPU 41, a signal received from an input device such as the mouse 52 or the keyboard 54. The input and output interface 47 reads information such as various computer programs and data from a recording medium 56 and writes the read information to the HDD 45 or the like based on an instruction from the CPU 41. The input and output interface 47 reads information stored in the HDD 45 or the like and writes the read information to the recording medium 56 based on an instruction from the CPU 41. The recording medium 56 is, for example, a compact disc (CD; registered trademark), a digital versatile disc (DVD; registered trademark), or a Universal Serial Bus (USB) memory. The communication interface 48 communicates, through the network NW, information with another device connected with the network NW.

FIG. 5 illustrates examples of the host management table 35 and the virtual machine management table 36 illustrated in FIG. 3. The host management table 35 is an exemplary host information holding unit, and the virtual machine management table 36 is an exemplary virtual machine information holding unit. The host management table 35 includes a plurality of regions (hereinafter also referred to as row regions) storing, for each host 10, a host name for identifying the host 10, an actually available resource amount, a provisionally available resource amount, and a maintenance flag.

A host 10 indicated by a host name held in a row region, the maintenance flag of which is set to "1" is under maintenance. For example, the maintenance flag is set to "1" until any virtual machine VM migrated to another host 10 is returned after execution of the maintenance of the host 10 is determined and completed.

The virtual machine management table 36 includes a plurality of regions (hereinafter also referred to as row regions) storing, for each virtual machine, the name of a host at which the virtual machine is deployed, a virtual machine name for identifying the virtual machine VM, the amount of resources used for the virtual machine VM, a migration flag, and a migration source host name. In the virtual machine management table 36, the host name is exemplary first identification information for identifying a host 10 at which a virtual machine is deployed, and the virtual machine name is exemplary second identification information for identifying the virtual machine VM. The migration flag is an exemplary migration identifier for indicating a virtual machine VM to be migrated: the migration flag of "1" indicates that the virtual machine VM is to be migrated, and the migration flag of "0" indicates that the virtual machine VM is not to be migrated. The migration source host name is exemplary third identification information for identifying the migration source host 10 of the virtual machine VM.

FIG. 6 illustrates an exemplary operation executed by the management server 30 illustrated in FIG. 3 to migrate a virtual machine VM. In other words, FIG. 6 illustrates an exemplary information processing method performed by the management server 30. The operation illustrated in FIG. 6 is executed by the migration control unit 33, for example, before maintenance is performed at any of the hosts 10 included in the information processing system 102.

At step S10, the migration control unit 33 selects any of virtual machines VM deployed at a host 10 at which maintenance is performed. For example, the migration control unit 33 selects any of virtual machines VM each indicated by a virtual machine name in a row region holding the migration flag of "1" in the virtual machine management table 36 illustrated in FIG. 5. In the operation of migrating a virtual machine VM, which is illustrated in FIG. 6, a virtual machine VM selected once at step S10 is not selected at the following steps S10 repeatedly executed. Each migration flag and each migration source host name of the virtual machine management table 36 are set by the management server 30 before the operation illustrated FIG. 6 is started.

In the virtual machine management table 36 illustrated in FIG. 5, each row region includes regions storing the migration flag and the migration source host name, but no region may be provided for storing the migration flag. In this case, the migration control unit 33 selects any of virtual machines VM each indicated by a virtual machine name in a row region storing the migration source host name in the virtual machine management table 36. Thus, the virtual machine VM is migrated by using the migration source host name in place of the migration flag. In this case, it is possible to reduce the size of the virtual machine management table 36 as compared to a case in which the migration flag is stored.

Subsequently at step S12, the migration control unit 33 selects any of deployment destination hosts 10 except for a host 10 at which maintenance is performed among the plurality of hosts 10 included in the information processing system 102. In the operation of migrating a virtual machine VM, which is illustrated in FIG. 6, a host 10 selected once at step S12 is not selected at the following steps S12 repeatedly executed.

Subsequently at step S14, the migration control unit 33 determines whether it is possible to migrate the virtual machine VM selected at step S10 to the host 10 selected at step S12. The migration control unit 33 determines that the migration is possible when an actually available resource amount held in the host management table 35 for the selected host 10 is equal to or larger than a resource amount held in the virtual machine management table 36 for the selected virtual machine VM. When the migration is possible, the selected host 10 is provisionally determined to be a migration destination, and the processing proceeds to step S16.

The migration control unit 33 determines that the migration is impossible when the actually available resource amount held in the host management table 35 for the selected host 10 is smaller than the resource amount held in the virtual machine management table 36 for the selected virtual machine VM. When the migration is impossible, the processing proceeds to step S20 to select another host 10. In the process illustrated in FIG. 6, it is possible to migrate the virtual machine VM to any of the hosts 10.

At step S16, the migration control unit 33 determines whether the actually available resource amount of the host 10, the migration to which is determined to be possible at step S16 is smaller than the actually available resource amount of the previously determined host 10. When the actually available resource amount of the host 10, the migration to which is determined to be possible is smaller than the actually available resource amount of the previously determined host 10, the processing proceeds to step S18. When the actually available resource amount of the host 10, the migration to which is determined to be possible is equal to or larger than the actually available resource amount of the previously determined host 10, the processing proceeds to step S20. When a migration destination host 10 is selected first at step S12, there is no host 10 to be compared, and thus the processing proceeds to step S18 without executing the determination at step S16.

At step S18, the migration control unit 33 determines the host 10 selected at step S12 to be a candidate host 10 to which the virtual machine VM is to be migrated, and the processing proceeds to step S20. When a host 10, the actually available resource amount of which is smaller than that of any other host 10 is determined to be a migration destination candidate at step S16, it is possible to migrate the virtual machine VM to the host 10 by the stuffing method. Accordingly, a host 10, the actually available resource amount of which is larger than that of any other host 10 is included in the deployment destination hosts 10. Since any host 10, the actually available resource amount of which is smaller than the amount of resources used for the virtual machine VM is not selected as a migration destination through the processing at step S14, it is possible to avoid overcommitment.

At step S20, when all deployment destination hosts 10 have been selected, the migration control unit 33 proceeds the processing to step S22. When the deployment destination hosts 10 include a host 10 yet to be selected at step S12, the migration control unit 33 returns the processing to step S12.

At step S22, the migration control unit 33 migrates the virtual machine VM selected at step S10 to the host 10 at which maintenance is performed to the host 10 determined at step S18 by a method such as live migration.

Subsequently at step S100, the migration control unit 33 issues, to the actual resource amount calculation unit 34, an instruction to calculate the actually available resource amount of the host 10 as the migration destination of the virtual machine VM. The actual resource amount calculation unit 34 calculates the actually available resource amount of the host 10 as the migration destination of the virtual machine VM at step S22 based on the instruction from the migration control unit 33. FIG. 9 illustrates exemplary processing executed by the actual resource amount calculation unit 34 to calculate the actually available resource amount.

Subsequently at step S24, the migration control unit 33 stores, in the host management table 35, the actually available resource amount of the host 10 as the migration destination of the virtual machine VM, which is calculated by the actual resource amount calculation unit 34. The migration control unit 33 also stores a host name for identifying the migration destination host 10 in a host name region in a row region corresponding to the migrated virtual machine VM in the virtual machine management table 36. Accordingly, the migration control unit 33 updates the host management table 35 and the virtual machine management table 36.

In the host management table 35, the actually available resource amount of the migration source host 10 of the virtual machine VM is not updated and thus indicates a state before the operation illustrated in FIG. 6 is started (before the migration of the virtual machine VM). However, a state in which the virtual machine VM is returned to the migration source host 10 after the maintenance is performed is same as the state before the migration of the virtual machine VM. In addition, no new virtual machine VM is deployed at the migration source host 10 of the virtual machine VM until the maintenance is completed. Thus, no failure occurs when the actually available resource amount of the migration source host 10 of the virtual machine VM is not updated. The actually available resource amount held in the host management table 35 may be updated in accordance with the migration of the virtual machine VM.

Subsequently at step S26, the migration control unit 33 determines whether all virtual machines VM have been migrated from the host 10 at which the maintenance is performed. The processing ends when all virtual machines VM have been migrated. The processing returns to step S10 when there is any virtual machine VM yet to be migrated to the host 10 at which the maintenance is performed.

In the operation illustrated in FIG. 6, at each migration of a virtual machine VM to a host 10, the actually available resource amount of the migration destination host 10 is calculated, and the host management table 35 is updated. Accordingly, when deploying a new virtual machine VM at the host 10 during the migration of the virtual machine VM, the deployment control unit 31 deploys virtual machines VM based on actually available resource amounts stored in the host management table 35 without causing overcommitment.

FIG. 7 illustrates an exemplary operation executed by the management server 30 illustrated in FIG. 3 to deploy a new virtual machine VM at a host 10. In other words, FIG. 7 illustrates an exemplary information processing method performed by the management server 30. The operation illustrated in FIG. 7 is executed by the deployment control unit 31, for example, when the management server 30 receives an instruction to deploy a new virtual machine VM from the terminal device TM operated by a user who uses the virtual machine VM for data processing or the like.

At step S42, the deployment control unit 31 selects any of deployment destination hosts 10. For example, the deployment control unit 31 selects a host 10 indicated by a host name held in any row region, the maintenance flag of which is "0" in the host management table 35. In the operation of deploying a virtual machine VM, which is illustrated in FIG. 7, a host 10 selected once at step S42 is not selected at the following steps S42 repeatedly executed.

Subsequently at step S44, the deployment control unit 31 determines whether it is possible to deploy a virtual machine VM, deployment of which is instructed at the host 10 selected at step S42. In the process illustrated in FIG. 7, it is possible to deploy a virtual machine VM at any of the hosts 10. The deployment control unit 31 determines that the deployment is possible when an actually available resource amount held in the host management table 35 for the selected host 10 is equal to or larger than the resource amount of the virtual machine VM to be newly deployed. When the deployment is possible, the selected host 10 is provisionally determined to be a deployment destination, and the processing proceeds to step S46. The deployment control unit 31 determines that the deployment is impossible when the actually available resource amount held in the host management table 35 for the selected host 10 is smaller than the resource amount of the virtual machine VM to be newly deployed. When the deployment is impossible, the processing proceeds to step S50 to select another host 10.

At step S46, the deployment control unit 31 determines whether the provisionally available resource amount of the provisionally determined host 10 is larger than the provisionally available resource amount of the previously determined host 10. When the provisionally available resource amount is larger than the provisionally available resource amount of the previously determined host 10, the processing proceeds to step S48. When the provisionally available resource amount is equal to or smaller than the provisionally available resource amount of the previously determined host 10, the processing proceeds to step S50. The deployment of the virtual machine VM to the host 10 is executed by the load balance method based on provisionally available resource amounts through the determination at step S46. When a deployment destination host 10 is selected first at step S42, there is no host 10 to be compared, and thus the processing proceeds to step S48 without executing the determination at step S46.

At step S48, the deployment control unit 31 determines the host 10 selected at step S42 to be a host 10 at which the virtual machine VM is to be deployed, and the processing proceeds to step S50. Since a host 10, the actually available resource amount of which is smaller than the resource amount of the virtual machine VM is not selected as a deployment destination through the processing at step S44, it is possible to avoid overcommitment.

At step S50, when all deployment destination hosts 10 have been selected, the deployment control unit 31 proceeds the processing to step S52. When the deployment destination hosts 10 include a host 10 yet to be selected at step S40, the deployment control unit 31 returns the processing to step S40.

At step S52, the deployment control unit 31 deploys the new virtual machine VM at the host 10 determined at step S48. The new virtual machine VM is deployed by the load balance method excluding the resource amount of any virtual machine VM temporarily migrated due to maintenance or the like. Accordingly, after the temporarily migrated virtual machine VM is returned to the migration source host 10, the actually available resource amounts of the deployment destination hosts 10 are equalized. As a result, it is possible to avoid variance in the processing performance of the deployment destination hosts 10 after the temporarily migrated virtual machine VM is returned to the migration source host 10.

Subsequently at step S100, the deployment control unit 31 issues, to the actual resource amount calculation unit 34, an instruction to calculate the actually available resource amount of the host 10 at which the virtual machine VM is deployed. The actual resource amount calculation unit 34 calculates, based on the instruction from the deployment control unit 31, the actually available resource amount of the host 10 at which the virtual machine VM is deployed. FIG. 9 illustrates exemplary processing executed by the actual resource amount calculation unit 34 to calculate the actually available resource amount.

Subsequently at step S200, the deployment control unit 31 issues, to the provisional resource amount calculation unit 32, an instruction to calculate the provisionally available resource amount of the host 10 at which the virtual machine VM is deployed. The provisional resource amount calculation unit 32 calculates, based on the instruction from the deployment control unit 31, the provisionally available resource amount of the host 10 at which the virtual machine VM is deployed. FIG. 10 illustrates exemplary processing executed by the provisional resource amount calculation unit 32 to calculate the actually available resource amount.

Subsequently at step S54, the deployment control unit 31 stores, in the host management table 35, the actually available resource amount calculated by the actual resource amount calculation unit 34 and the provisionally available resource amount calculated by the provisional resource amount calculation unit 32. The deployment control unit 31 also stores information corresponding to the virtual machine VM deployed at step S52 in a new row region in the virtual machine management table 36. Accordingly, the deployment control unit 31 updates the host management table 35 and the virtual machine management table 36.

In this manner, at each deployment of a new virtual machine VM at a host 10, the deployment control unit 31 calculates the actually available resource amount of the host 10 at which the virtual machine VM is deployed, and stores the actually available resource amount in the host management table 35. Accordingly, when a new virtual machine VM is deployed at a host 10 during migration of a virtual machine VM, the migration control unit 33 migrates the virtual machine VM based on actually available resource amounts stored in the host management table 35 without causing overcommitment. In addition, at each deployment of a new virtual machine VM at a host 10, the deployment control unit 31 calculates the provisionally available resource amount of the host 10 at which the virtual machine VM is deployed, and stores the provisionally available resource amount in the host management table 35. Accordingly, when a plurality of new virtual machines VM are continuously deployed, the deployment control unit 31 determines a host 10 at which each new virtual machine VM is to be deployed based on the correct provisionally available resource amount thereof. As a result, the actually available resource amounts of deployment destination hosts 10 are equalized after a temporarily migrated virtual machine VM is returned to the migration source host 10, and thus it is possible to avoid variance in the processing performance of the deployment destination hosts 10.

FIG. 8 illustrates an exemplary operation executed by the management server 30 illustrated in FIG. 3 to return a virtual machine VM to a migration source host. In other words, FIG. 8 illustrates an exemplary information processing method performed by the management server 30. The operation illustrated in FIG. 8 is executed by the migration control unit 33, for example, when maintenance is completed at any of the hosts 10 included in the information processing system 102.

At step S60, the migration control unit 33 selects a virtual machine VM indicated by a virtual machine name in any row region storing a migration source host name in the virtual machine management table 36. In the operation of returning a virtual machine VM to a migration source host 10, which is illustrated in FIG. 8, a virtual machine VM selected once at step S60 is not selected at the following steps S60 repeatedly executed.

Subsequently at step S62, the migration control unit 33 migrates, by a method such as live migration, the virtual machine VM to a host 10 indicated by the migration source host name corresponding to the virtual machine VM selected at step S60 in the virtual machine management table 36. In other words, the migration control unit 33 removes the virtual machine VM selected at step S60 from the deployment destination host 10, and deploys the virtual machine VM at the migration source host 10.

The management server 30 stores, before maintenance, a migration source host name for identifying the migration source host 10 in a row region in the virtual machine management table 36 corresponding to the virtual machine VM to be migrated. Accordingly, the migration control unit 33 is capable of returning the virtual machine VM to the migration source host 10 by referring to the migration source host name irrespective of the migration destination of the virtual machine VM.

At step S100, the migration control unit 33 issues, to the actual resource amount calculation unit 34, an instruction to calculate the actually available resource amount of the host 10 from which the virtual machine VM is removed. The actual resource amount calculation unit 34 calculates, based on the instruction from the migration control unit 33, the actually available resource amount of the host 10 from which the virtual machine VM is removed.

At step S64, the migration control unit 33 stores, in the host management table 35, the actually available resource amount of the host 10 from which the virtual machine VM is removed, which is calculated by the actual resource amount calculation unit 34. The migration control unit 33 also stores a host name (same as the migration source host name) for identifying the migration source host 10 in a host name region corresponding to the removed virtual machine VM in the virtual machine management table 36. Accordingly, the migration control unit 33 updates the host management table 35 and the virtual machine management table 36.

In the operation illustrated in FIG. 8, at each returning of a virtual machine VM to the migration source host 10, the actually available resource amount of a host 10 from which the virtual machine VM is removed is calculated, and the host management table 35 is updated. Accordingly, the deployment control unit 31 is capable of deploying a new virtual machine VM at the host 10 without causing overcommitment in the operation of returning the virtual machine VM to the migration source host 10.

At step S66, when having selected all virtual machines VM to be returned to the migration source host 10, the migration control unit 33 ends the processing. When having not selected any virtual machine VM to be returned to the migration source host 10, the migration control unit 33 returns the processing to step S60. After the virtual machine VM is returned to the migration source, the management server 30 changes the migration flag from "1" to "0" and deletes the migration source host name in the virtual machine management table 36 illustrated in FIG. 5.

FIG. 9 illustrates an exemplary operation at step S100 illustrated in FIGS. 6, 7, and 8. The operation illustrated in FIG. 9 is executed by the actual resource amount calculation unit 34 based on an instruction from the migration control unit 33 or the deployment control unit 31.

At step S102, the actual resource amount calculation unit 34 selects, in the virtual machine management table 36, any row region holding the host name of a host 10 instructed by the migration control unit 33 or the deployment control unit 31. Specifically, the actual resource amount calculation unit 34 selects any virtual machine VM deployed at the instructed host 10. In the operation illustrated in FIG. 9, a virtual machine VM selected once at step S102 is not selected at the following steps S102 repeatedly executed.

Subsequently at step S104, the actual resource amount calculation unit 34 reads a resource amount held in the row region selected at step S102. Then, the actual resource amount calculation unit 34 integrates the resource amount with a resource amount held in a buffer region or the like to calculate the resource amount of the virtual machine VM deployed at the instructed host 10. The resource amount held in the buffer region or the like is reset to "0" at start of step S100.

Subsequently at step S106, when all virtual machine VM deployed at the instructed host 10 have been selected, the actual resource amount calculation unit 34 proceeds the processing to step S108. When any of the virtual machines VM deployed at the instructed host 10 has not been selected at step S102, the actual resource amount calculation unit 34 returns the processing to step S102.

At step S108, the actual resource amount calculation unit 34 subtracts the integrated resource amount calculated at step S104 from the total amount of resources available for deployment of virtual machines VM at the host 10 instructed by the migration control unit 33 or the deployment control unit 31. Then, the actual resource amount calculation unit 34 calculates the actually available resource amount of the host 10. Subsequently at step S110, the actual resource amount calculation unit 34 notifies the calculated actually available resource amount to the migration control unit 33 or the deployment control unit 31 having issued the calculation instruction, and ends the processing.

FIG. 10 illustrates exemplary operation at step S200 illustrated in FIG. 7. The operation illustrated in FIG. 10 is executed by the provisional resource amount calculation unit 32 based on an instruction from the deployment control unit 31.

At step S202, the provisional resource amount calculation unit 32 selects any row region holding the host name of a host 10 instructed by the deployment control unit 31 in the virtual machine management table 36. Specifically, the provisional resource amount calculation unit 32 selects any virtual machine VM deployed at the instructed host 10. In the operation illustrated in FIG. 10, a virtual machine VM selected once at step S202 is not selected at the following steps S202 repeatedly executed.

Subsequently at step S204, the provisional resource amount calculation unit 32 determines whether the selected virtual machine VM is migrated from another host 10 based on the value of the migration flag in the row region corresponding to the selected virtual machine VM. When the migration flag is "1", it is determined that the virtual machine VM is migrated from another host 10, and the processing is returned to step S202. When the migration flag is "0", it is determined that the virtual machine VM is deployed based on an instruction from the terminal device TM (FIG. 3), and the processing proceeds to step S206. When the virtual machine management table 36 includes no region storing the migration flag, the migration control unit 33 uses migration source host names to determine whether the virtual machine VM is migrated from another host 10.

At step S206, the provisional resource amount calculation unit 32 reads a resource amount held in the row region selected at step S202, and integrates the resource amount with a resource amount held in the buffer region or the like to calculate the resource amount of the virtual machine VM deployed at the instructed host 10. The resource amount held in the buffer region or the like is reset to "0" at start of step S200. The virtual machine VM, the resource amount of which is integrated at step S206 does not include a virtual machine VM migrated from the migration source host 10.

At step S208, when all virtual machine VM deployed at the instructed host 10 have been selected, the provisional resource amount calculation unit 32 proceeds the processing to step S210. When any of the virtual machines VM deployed at the instructed host 10 is yet to be selected at step S202, the provisional resource amount calculation unit 32 returns the processing to step S202.

At step S210, the provisional resource amount calculation unit 32 subtracts the integrated resource amount calculated at step S206 from the total resource amount available for deployment of virtual machines VM at host 10 instructed by deployment control unit 31 and calculates a provisionally available resource amount. Subsequently at step S212, the provisional resource amount calculation unit 32 notifies the calculated provisionally available resource amount to the deployment control unit 31, and ends the processing.

When the virtual machine management table 36 includes a migration flag, the provisional resource amount calculation unit 32 excludes a virtual machine VM migrated from another host 10 as a resource amount integration target based on the migration flag. Specifically, the provisionally available resource amount of each host 10 is calculated by using the migration flag.

Figure 11:
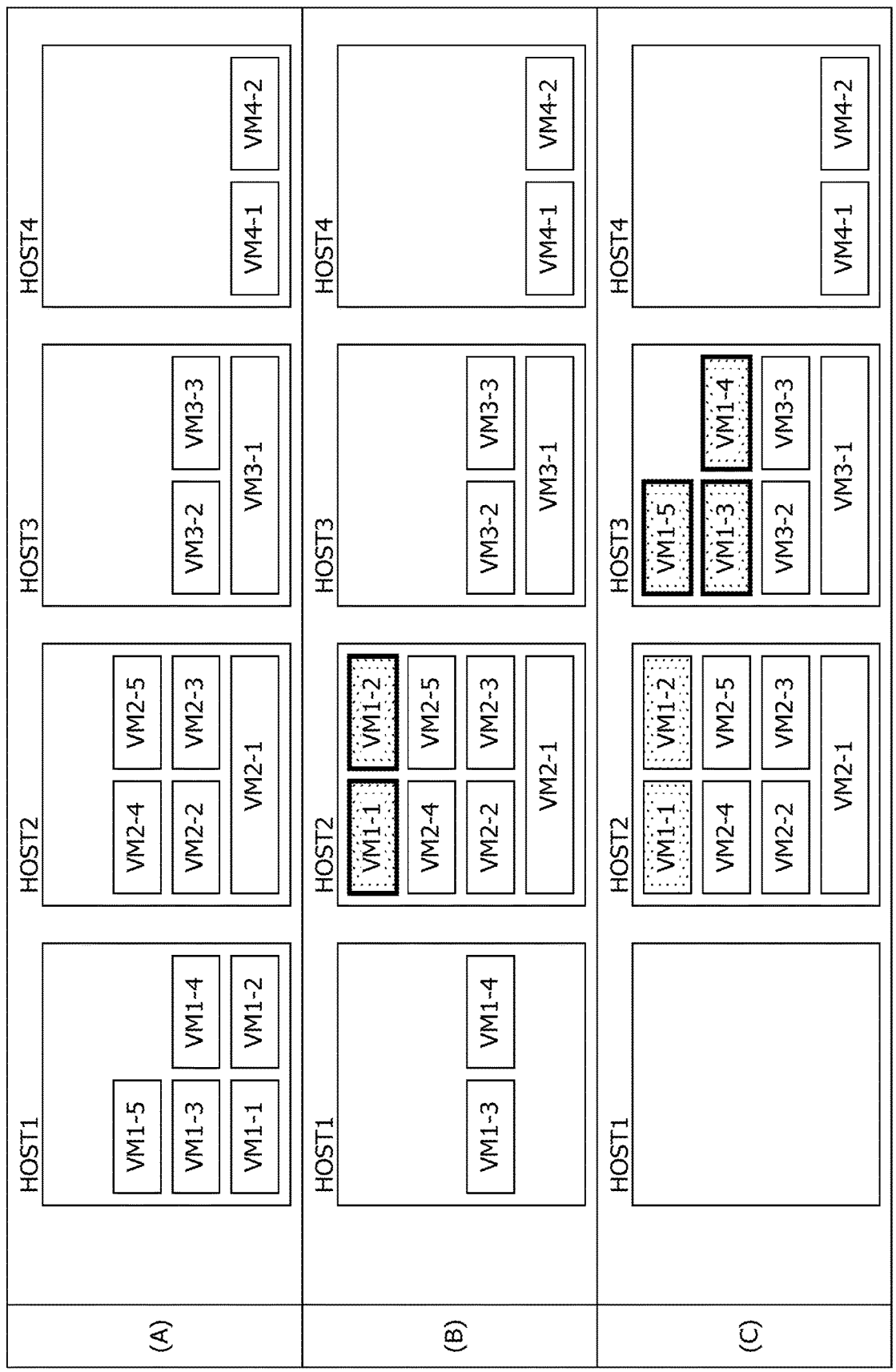
FIG. 11 is a diagram illustrating an exemplary operation of the information processing system illustrated in FIG. 3.

FIG. 11 illustrates an exemplary operation of the information processing system 102 illustrated in FIG. 3. In FIG. 11, the state changes in the order of (A), (B), and (C). Each host 10 is indicated by a host name such as HOST1, and each virtual machine VM is indicated by a virtual machine name such as VM1-1. The size of each rectangle representing a virtual machine VM indicates the amount of resources used for the virtual machine VM.

(A) of FIG. 11 indicates a state corresponding to information held in the host management table 35 and the virtual machine management table 36 illustrated in FIG. 5, in which virtual machines VM are deployed at four hosts HOST (HOST1 to HOST4). As illustrated in FIG. 5, a virtual machine VM deployed at the host HOST1 is migrated to another HOST when maintenance is to be performed at the host HOST1.

In (B) of FIG. 11, the virtual machines VM1-1 and VM1-2 are sequentially migrated from the host HOST1 to the host HOST2, the actually available resource amount of which is smallest among the host HOST2 to HOST4 to which migration is possible, by the stuffing method in accordance with the process illustrated in FIG. 6. In FIG. 11, each virtual machine VM illustrated with a bold frame indicates that the deployment destination thereof is changed from that in the previous state. Each virtual machine VM illustrated with hatching indicates that the virtual machine VM is migrated from the host HOST1 to another host HOST, and the provisionally available resource amount thereof is not calculated. In other words, the resource amount of a virtual machine VM illustrated with hatching is included in the provisionally available resource amount.

In (C) of FIG. 11, the virtual machines VM1-3, VM1-4, and VM1-5 are sequentially migrated from the host HOST1 to the host HOST3, the actually available resource amount of which is smallest among the hosts HOST3 and HOST4 to which migration is possible, in accordance with the process illustrated in FIG. 6. This completes the migration of the virtual machines VM1-1, VM1-2, VM1-3, VM1-4, and VM1-5 from the host HOST1. Since the resource amount of a virtual machine VM illustrated with hatching is included in the provisionally available resource amount, for example, the provisionally available resource amount of the host HOST3 in (C) of FIG. 11 is equal to the provisionally available resource amount of the host HOST3 and the actually available resource amount in (B) of FIG. 11.

FIG. 12 illustrates the states of the host management table 35 and the virtual machine management table 36 for (C) of FIG. 11. Each bold frame illustrated in FIG. 12 indicates a region in a state changed from that in FIG. 5. In the virtual machine management table 36, host names in the row regions corresponding to the virtual machines VM1-1, VM1-2, VM1-3, VM1-4, and VM1-5 are changed to the hosts HOST2 and HOST3 as migration destinations. The migration control unit 33 does not change the state of the host HOST1 from which the virtual machines VM are migrated in the host management table 35. Since the provisionally available resource amount is calculated excluding the migrated virtual machines VM, the provisionally available resource amount in the host management table 35 is same as that in FIG. 5. The actually available resource amount and the provisionally available resource amount of the host HOST4 to which the virtual machines VM are not migrated are equal to each other.

Figure 13:
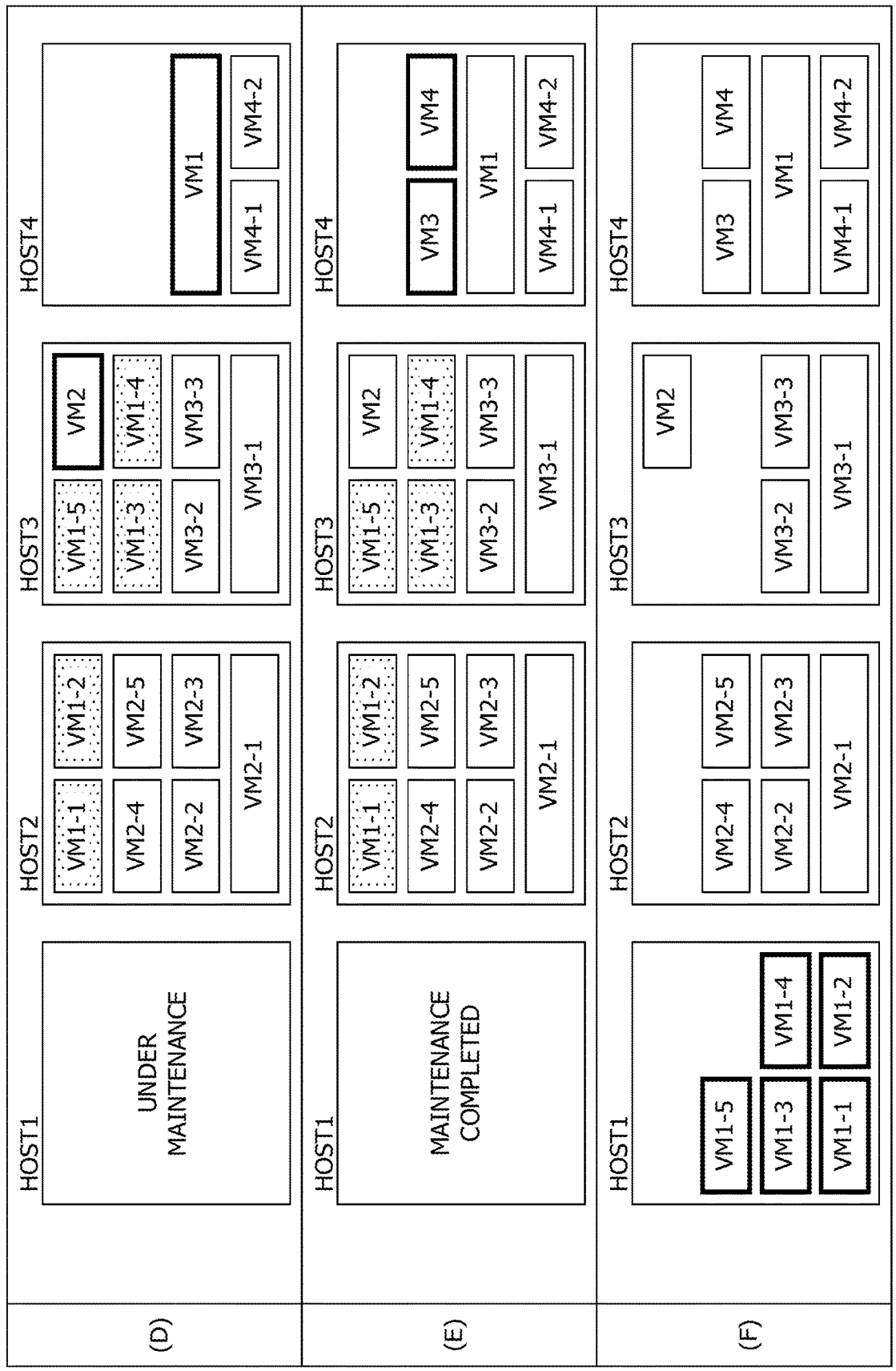
FIG. 13 is a diagram illustrating continuation of the operation illustrated in FIG. 11.

FIG. 13 illustrates continuation of the operation illustrated in FIG. 11. A bold frame and hatching with which a virtual machine VM is illustrated have the same meaning as that in FIG. 11. In FIG. 13, the state changes in the order of (D), (E), and (F).

In (D) of FIG. 13, the management server 30 sequentially receives requests for deployment of the new virtual machines VM1 and VM2 during maintenance of the host HOST1. The deployment control unit 31 sequentially deploys the new virtual machines VM1 and VM2 by the load balance method in accordance with the process illustrated in FIG. 7. The virtual machine VM1 is deployed at the host HOST4, the provisionally available resource amount of which is largest among the hosts HOST3 and HOST4 at which deployment is possible. After the virtual machine VM1 is deployed, the provisionally available resource amount of the host HOST3 is larger than the provisionally available resource amount of the host HOST4. Thus, the virtual machine VM2 is deployed at the host HOST3, the provisionally available resource amount of which is largest among the hosts HOST3 and HOST4 at which deployment is possible.

In (E) of FIG. 13, only the host HOST4 is a host HOST at which deployment of a virtual machine VM is possible, and thus the new virtual machines VM3 and VM4 are sequentially deployed at the host HOST4. The maintenance of the host HOST1 is completed in (E) of FIG. 13, and the processing of returning the virtual machines VM1-1, VM1-2, VM1-3, VM1-4, and VM1-5 to the migration source host HOST1 is executed in (F) of FIG. 13.

In (F) of FIG. 13 after the virtual machines VM1-1, VM1-2, VM1-3, VM1-4, and VM1-5 are returned to the host HOST1, the provisionally available resource amounts of the deployment destination hosts HOST2 to HOST4 are substantially equal to each other. Accordingly, when a new virtual machine VM is deployed at a host HOST, the provisionally available resource amount of which is largest and at which deployment is possible, the available resource amounts of hosts HOST at which deployment is possible are equalized after each virtual machine VM is returned to the migration source host HOST1. As a result, loads on hosts HOST at which deployment is possible are equalized after each virtual machine VM is returned to the migration source host HOST1.

FIG. 14 illustrates the states of the host management table 35 and the virtual machine management table 36 for (F) of FIG. 13. Each bold frame illustrated in FIG. 14 indicates a region in a state changed from that in FIG. 12.

In the host management table 35, the actually available resource amounts of the hosts HOST2 and HOST3 increase since the virtual machines VM are returned to the host HOST1. The actually available resource amount of the host HOST4 decreases since the virtual machines VM1, VM3, and VM4 are deployed at the host HOST4. In the host management table 35, the maintenance flag of the host HOST1 is reset to "0" by the management server 30. In the virtual machine management table 36, the host names of the virtual machines VM1-1, VM1-2, VM1-3, VM1-4, and VM1-5 returned to the host HOST1 are changed. In addition, the migration flags are reset to "0" and the migration source host names are deleted by the management server 30. Alternatively, each migration source host name does not have to be deleted but may be regarded as ineffective when the corresponding migration flag is "0". In addition, information is stored in new row regions corresponding to the newly disposed virtual machines VM1, VM2, VM3, and VM4 in the virtual machine management table 36.

Figure 15:
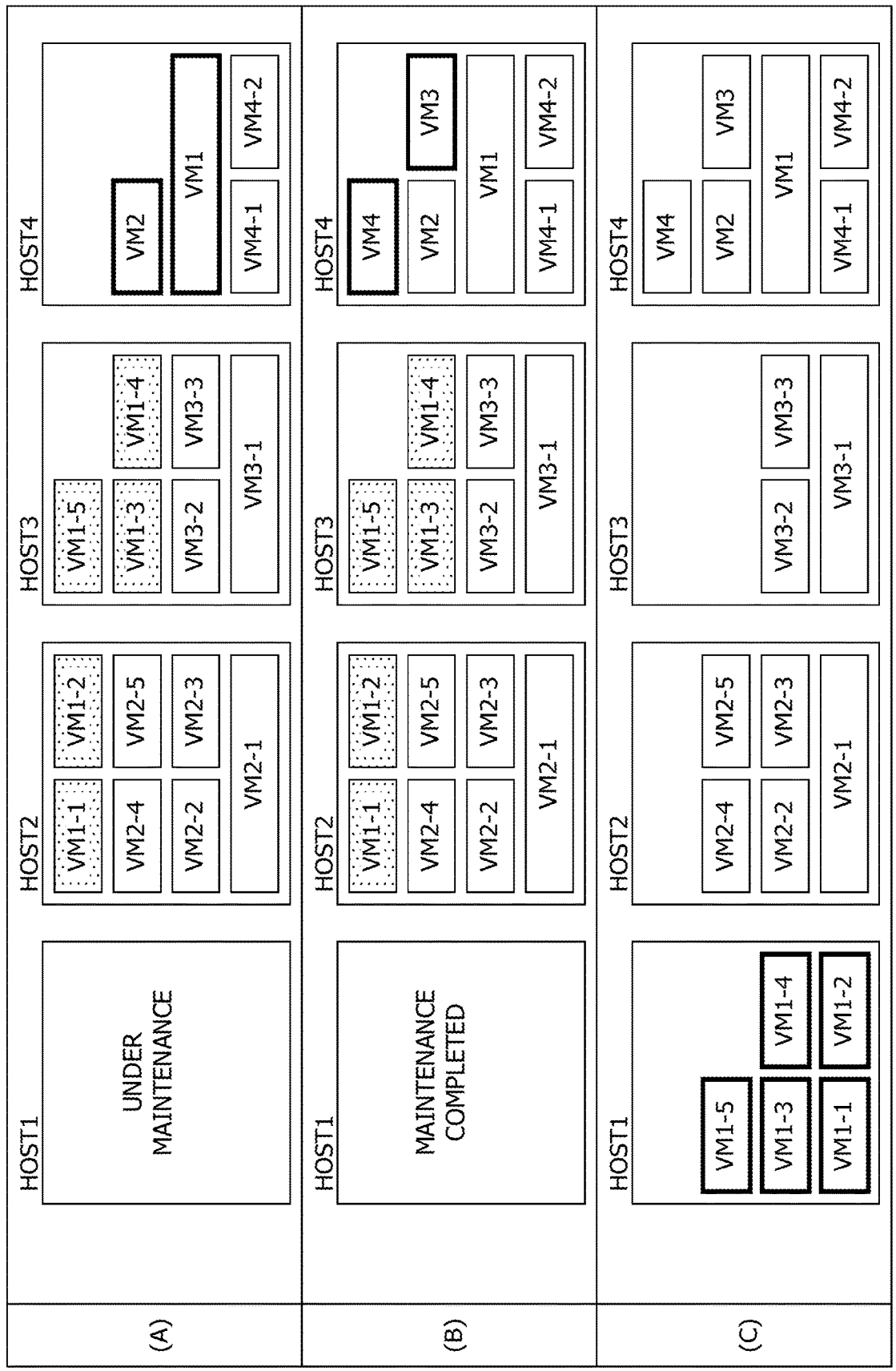
FIG. 15 is a diagram illustrating an exemplary operation of another information processing system including a management server not configured to calculate a provisional available resource amount.

FIG. 15 illustrates an exemplary operation of another information processing system including a management server configured to calculate no provisionally available resource amount. A bold frame and hatching with which a virtual machine VM is illustrated have the same meaning as that in FIG. 11. In FIG. 15, the state changes in the order of (A), (B), and (C).

In (A) of FIG. 15, the states of the hosts HOST2 and HOST3 are same as those in (C) of FIG. 11. The virtual machines VM1-1, VM1-2, VM1-3, VM1-4, and VM1-5 are migrated to the hosts HOST2 and HOST3 by the stuffing method, and maintenance is started at the host HOST1. During the maintenance of the host HOST1, the new virtual machines VM1 and VM2 are sequentially deployed by the load balance method. However, the virtual machines VM1 and VM2 are deployed based on actually available resource amounts. Thus, the deployment destination of the virtual machine VM1 is same as that in (A) of FIG. 13, but the virtual machine VM2 is deployed at the host HOST4, the actually available resource amount of which is largest among the hosts HOST3 and HOST4 at which deployment is possible.

In (B) of FIG. 15, the new virtual machines VM3 and VM4 are sequentially deployed based on actually available resource amounts by the load balance method. The virtual machines VM3 and VM4 are deployed at the host HOST4, the actually available resource amount of which is largest among the hosts HOST3 and HOST4 at which deployment is possible. The maintenance of the host HOST1 is completed in (B) of FIG. 15, and the processing of returning the virtual machines VM1-1, VM1-2, VM1-3, VM1-4, and VM1-5 to the migration source host HOST1 is executed in (C) of FIG. 15.

In (C) of FIG. 15, variance occurs in the provisionally available resource amounts and the actually available resource amounts of the deployment destination hosts HOST2 to HOST4 after the virtual machines VM1-1, VM1-2, VM1-3, VM1-4, VM1-5 are returned to the migration source host HOST1. Thus, when a new virtual machine VM is deployed at a host HOST, the actually available resource amount of which is largest and at which deployment is possible, variance potentially occurs in the available resource amounts of hosts HOST at which deployment is possible after the virtual machine VM is returned to the migration source host HOST1. As a result, it is difficult to equalize loads on the hosts HOST at which deployment is possible after the virtual machine VM is returned to the migration source host HOST1.

Accordingly, the embodiment illustrated in FIGS. 3 to 14 achieves effects same as those of the embodiment illustrated in FIGS. 1 and 2. For example, when a virtual machine VM is migrated to a host HOST by the stuffing method and a new virtual machine VM is deployed at a host HOST by the load balance method, the new virtual machine VM is deployed at a host HOST, the provisionally available resource amount of which is larger than those of the other hosts. Accordingly, after the virtual machine VM is returned to the migration source host HOST1, the available resource amounts of hosts HOST are equalized, and loads on the hosts HOST are equalized. When a host HOST at which a virtual machine VM is to be deployed is determined based on provisionally available resource amounts, it is possible to avoid overcommitment by avoiding deployment of the virtual machine VM at a host HOST, the actually available resource amount of which is insufficient.

In addition, the embodiment illustrated in FIGS. 3 to 14 achieves effects described below. Since the host management table 35 is updated at each migration or deployment of a virtual machine VM, it is possible to deploy, during migration of a virtual machine VM, a new virtual machine VM based on correct actually available resource amounts without causing overcommitment.

When the virtual machine management table 36 includes a region storing a migration flag, the provisional resource amount calculation unit 32 is capable of excluding, as a provisionally available resource amount integration target, a virtual machine VM migrated from another host HOST based on the migration flag. When the virtual machine management table 36 includes a region storing a migration source host name, the migration control unit 33 is capable of returning a virtual machine VM to a migration source host HOST by referring to the migration source host name irrespective of the migration destination of the virtual machine VM.

Figure 16:
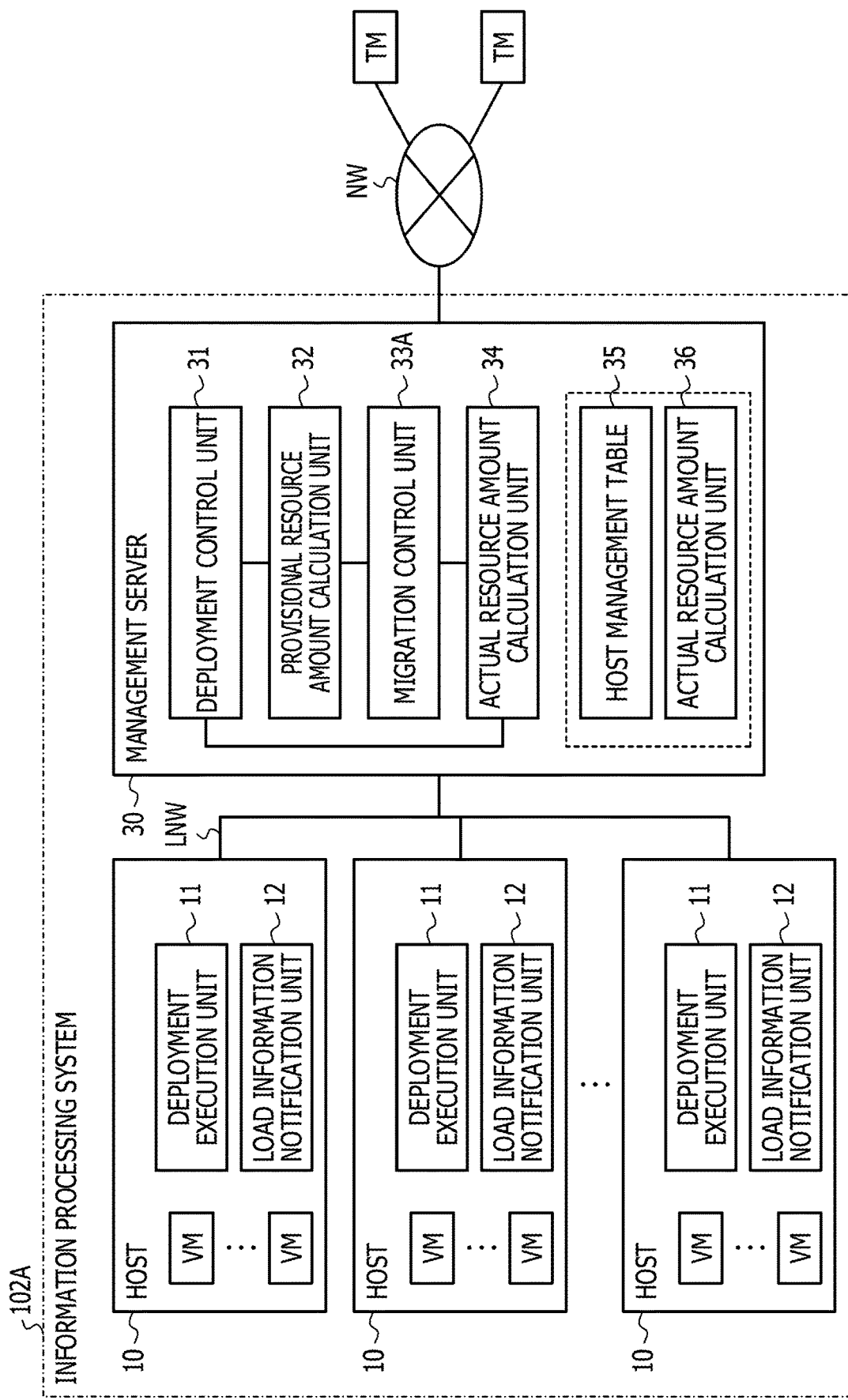
FIG. 16 is a diagram illustrating an information processing device, an information processing system, and an information processing method according to another embodiment.

FIG. 16 illustrates an information processing device, an information processing system, and an information processing method according to another embodiment. Any component identical or equivalent to that illustrated in FIG. 3 is denoted by an identical reference sign, and detailed description thereof will be omitted. An information processing system 102A illustrated in FIG. 16 includes a migration control unit 33A in place of the migration control unit 33 illustrated in FIG. 3. The other configuration of the information processing system 102A is same as that of the information processing system 102 illustrated in FIG. 3. The migration control unit 33A migrates a virtual machine VM from a host 10 at which maintenance or the like is performed to another host 10 by the load balance method instead of the stuffing method.

Figure 17:
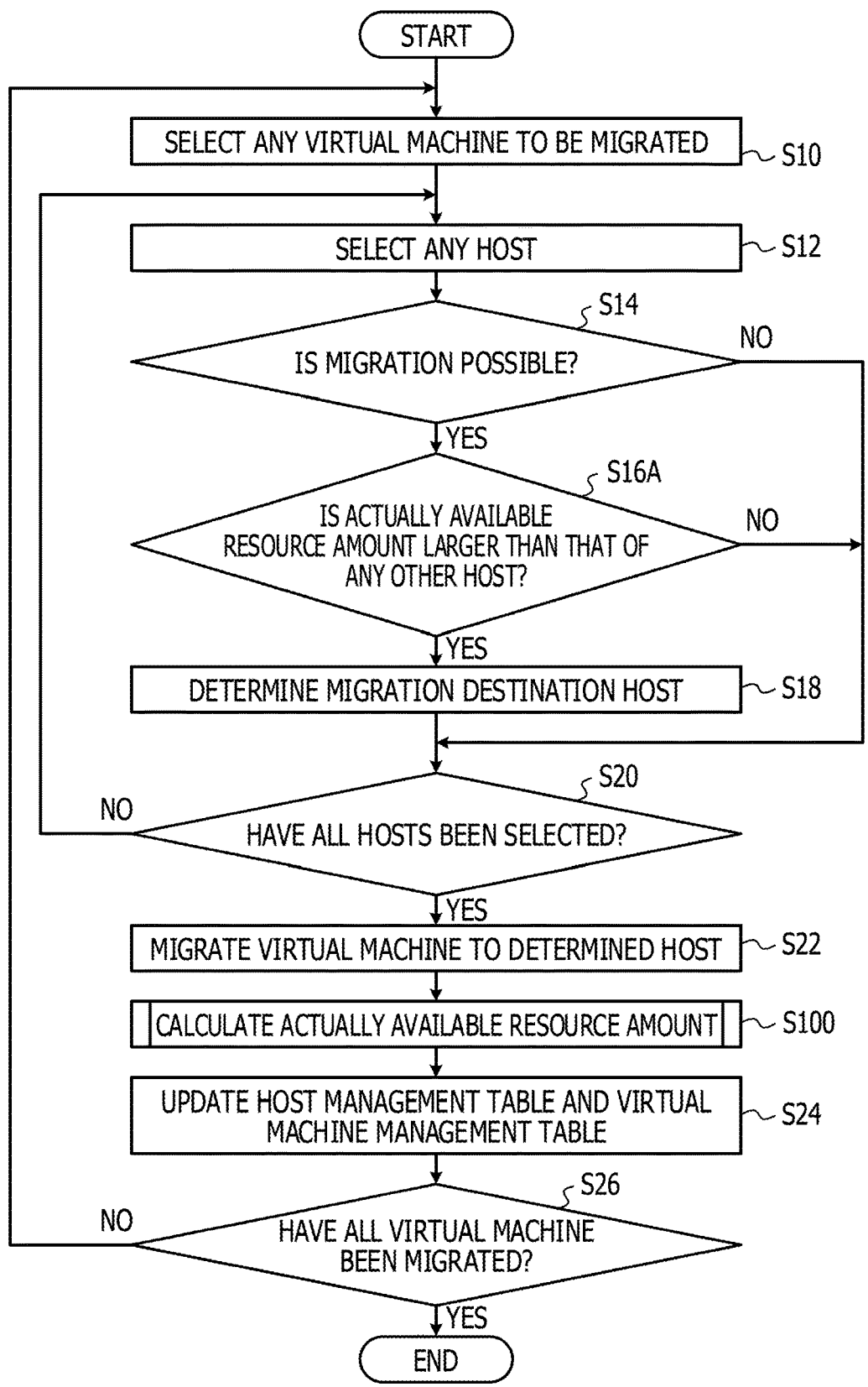
FIG. 17 is a diagram illustrating an exemplary operation of migrating a virtual machine in a management server illustrated in FIG. 16.

FIG. 17 illustrates an exemplary operation executed by the management server 30 illustrated in FIG. 16 to migrate a virtual machine VM. In other words, FIG. 17 illustrates an exemplary information processing method performed by the management server 30. Any processing identical or equivalent to that in FIG. 6 is denoted by an identical reference sign, and detailed description thereof will be omitted. In FIG. 17, step S16A is executed in place of step S16 illustrated in FIG. 6. The other processing in FIG. 17 is same as that in FIG. 6. Similarly to FIG. 6, the operation illustrated in FIG. 17 is executed by the migration control unit 33A, for example, before maintenance is performed at any host 10 included in the information processing system 102A. The operation of the deployment control unit 31 is same as that in FIG. 7, and an operation executed by the migration control unit 33A to return a virtual machine VM to the migration source host 10 is same as that in FIG. 8.

Similarly to FIG. 6, when it is possible to migrate the virtual machine VM selected at step S10 to the host 10 selected at step S12 at step S14, the processing proceeds to step S16A.

At step S16A, the migration control unit 33A determines whether the actually available resource amount of the provisionally determined host 10 is larger than the actually available resource amount of the previously determined host 10. When the actually available resource amount of the provisionally determined host 10 is larger than the actually available resource amount of the previously determined host 10, the processing proceeds to step S18. When the actually available resource amount of the provisionally determined host 10 is equal to or smaller than the actually available resource amount of the previously determined host 10, the processing proceeds to step S20. When a migration destination host 10 is selected first at step S12, there is no host 10 to be compared, and thus the processing proceeds to step S18 without executing the determination at step S16A. The migration destination of the virtual machine VM is determined by the load balance method at step S18 and later through the determination at step S16A.

Figure 18:
FIG. 18 is a diagram illustrating an exemplary operation of the information processing system illustrated in FIG. 16.

FIG. 18 illustrates an exemplary operation of the information processing system 102A illustrated in FIG. 16. Detailed description of any operation identical or equivalent to that in FIG. 11 will be omitted. Each virtual machine VM illustrated with a bold frame indicates that the deployment destination thereof is changed from that in the previous state. Each virtual machine VM illustrated with hatching indicates that the virtual machine VM is migrated from the host HOST1 to another host HOST. The state in (A) of FIG. 18 is same as that in (A) of FIG. 11 except that the virtual machine VM1-5 is not deployed at the host HOST1.

In (B) of FIG. 18, the virtual machines VM1-1 and VM1-2 are sequentially migrated from the host HOST1 to the host HOST4, the actually available resource amount of which is largest among the host HOST2 to HOST4 to which migration is possible, by the load balance method in accordance with the process illustrated in FIG. 17.

In (C) of FIG. 18, the virtual machine VM1-3 is migrated from the host HOST1 to the host HOST3, the actually available resource amount of which is largest among the hosts HOST3 and HOST4 to which migration is possible, in accordance with the process illustrated in FIG. 17. Subsequently, the virtual machine VM1-4 is migrated from the host HOST1 to the host HOST4, the actually available resource amount of which is largest among the hosts HOST3 and HOST4 to which migration is possible. This completes the migration of the virtual machines VM1-1, VM1-2, VM1-3, and VM1-4 from the host HOST1.

Figure 19:
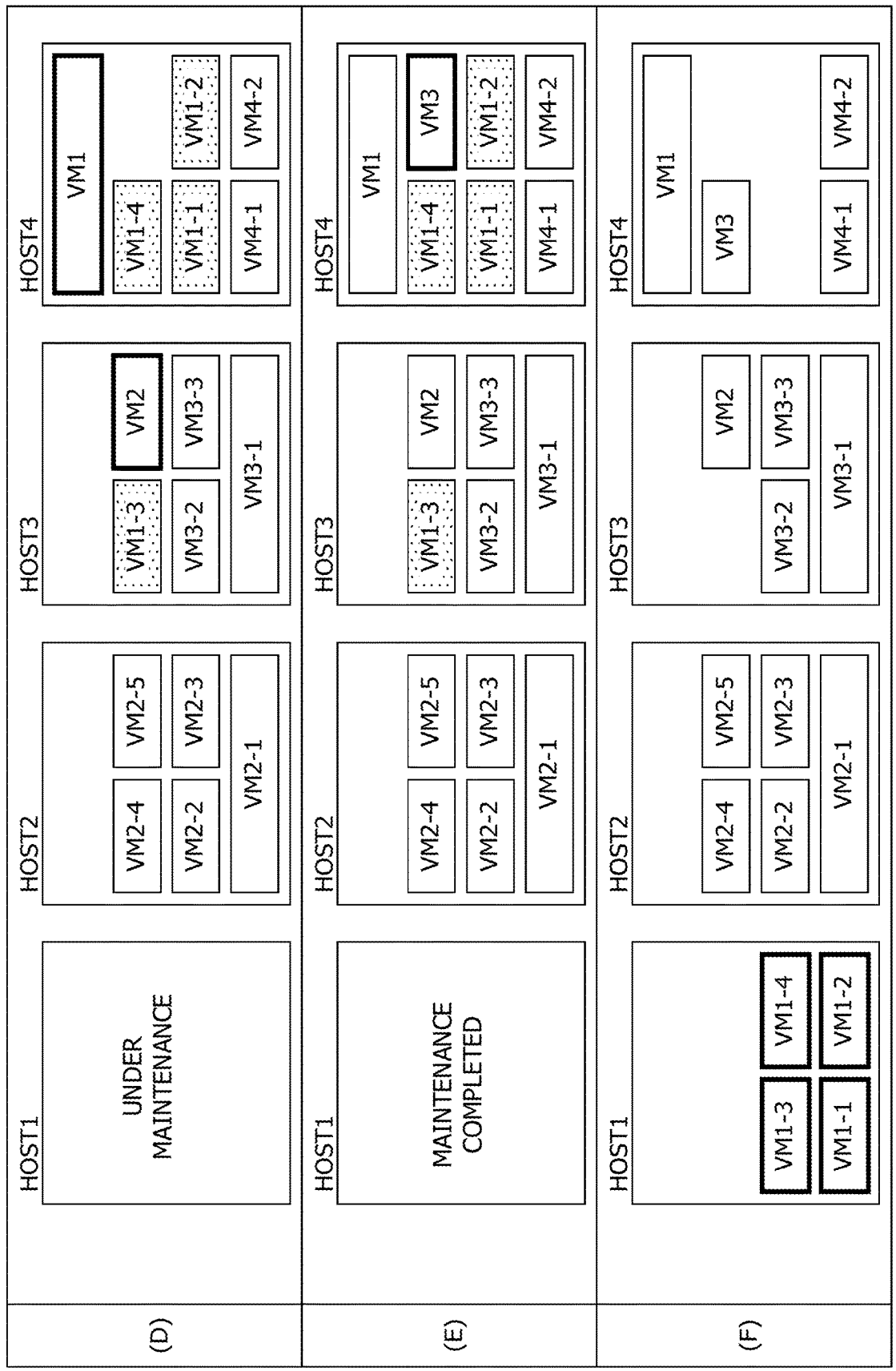
FIG. 19 is a diagram illustrating continuation of the operation illustrated in FIG. 18.

FIG. 19 illustrates continuation of the operation illustrated in FIG. 18. A bold frame and hatching with which a virtual machine VM is illustrated have the same meaning as that in FIG. 11. In FIG. 19, the state changes in the order of (D), (E), and (F).

In (D) of FIG. 19, the new virtual machines VM1 and VM2 are sequentially deployed by the load balance method in accordance with the process illustrated in FIG. 7 during maintenance of the host HOST1. The virtual machine VM1 is deployed at the host HOST4, the provisionally available resource amount of which is largest among the hosts HOST3 and HOST4 at which deployment is possible. After the virtual machine VM1 is deployed, the provisionally available resource amount of the host HOST3 is larger than the provisionally available resource amount of the host HOST4. Thus, the virtual machine VM2 is deployed at the host HOST3, the provisionally available resource amount of which is largest among the hosts HOST3 and HOST4 at which deployment is possible. After the virtual machine VM2 is deployed at the host HOST3, the provisionally available resource amount of the host HOST4 is larger than the provisionally available resource amount of the host HOST3.

In (E) of FIG. 19, the new virtual machine VM3 is deployed at the host HOST4, the provisionally available resource amount of which is largest among the hosts HOST3 and HOST4 at which deployment of virtual machines VM is possible. The maintenance of the host HOST1 is completed in (E) of FIG. 19, and the processing of returning the virtual machines VM1-1, VM1-2, VM1-3, and VM1-4 to the migration source host HOST1 is executed in (F) of FIG. 19.

In (F) of FIG. 19, the provisionally available resource amounts of the deployment destination hosts HOST2 to HOST4 are substantially equal to each other after the virtual machines VM1-1, VM1-2, VM1-3, and VM1-4 are returned to the migration source host HOST1. Accordingly, when a virtual machine VM is migrated from the host HOST1 by the load balance method, the available resource amounts of hosts HOST at which deployment is possible are equalized after each virtual machine VM is returned to the migration source host HOST1. In other words, when a new virtual machine VM is deployed at a host HOST, the provisionally available resource amount of which is largest and at which deployment is possible, loads on hosts HOST at which deployment is possible are equalized after each virtual machine VM is returned to the migration source host HOST1.

Figure 20:
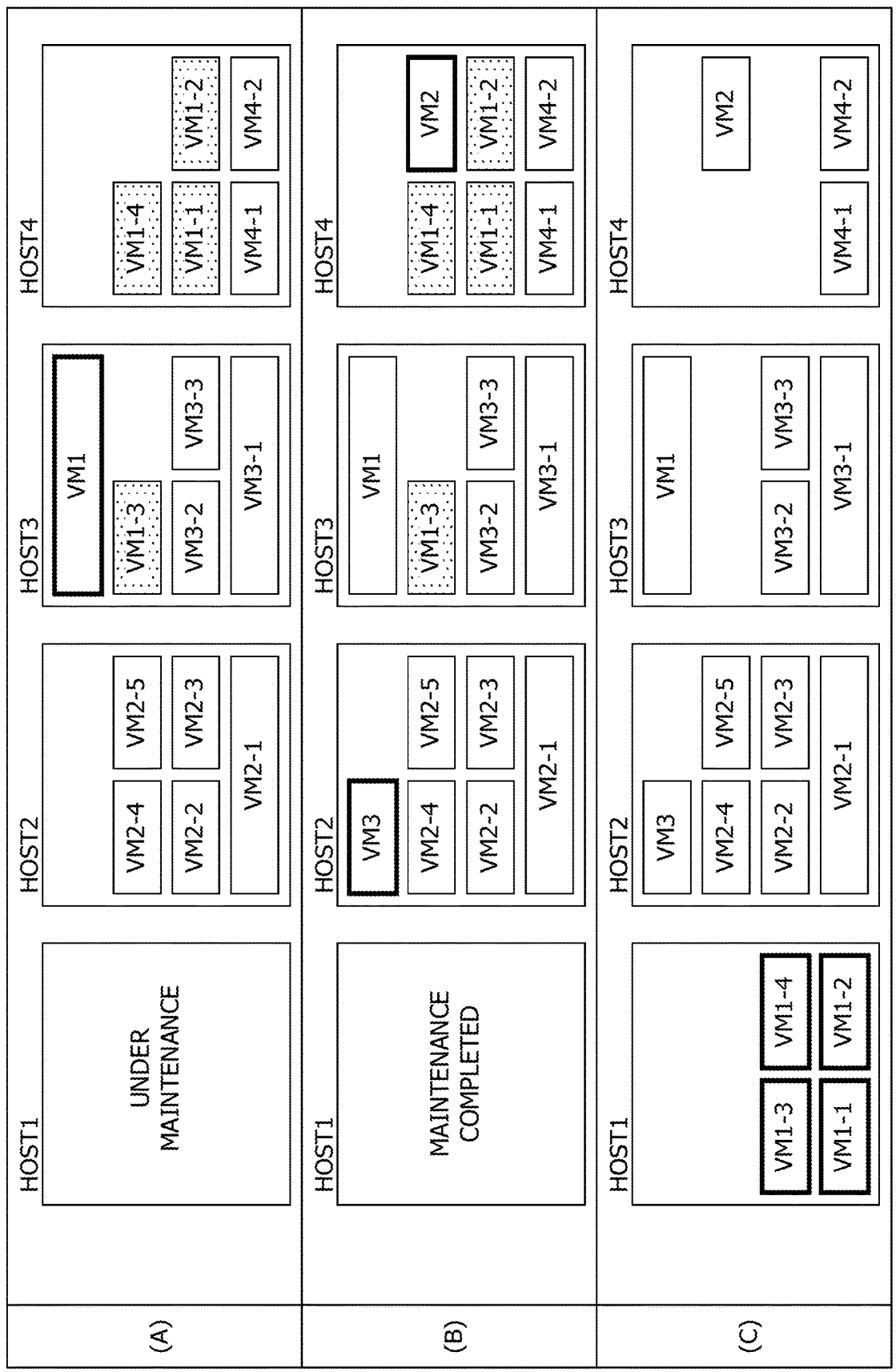
FIG. 20 is a diagram illustrating an exemplary operation of another information processing system including a management server configured to calculate no provisional available resource amount.

FIG. 20 illustrates an exemplary operation of another information processing system including a management server configured to calculate no provisionally available resource amount. Detailed description of any operation same as that in FIG. 15 will be omitted. A bold frame and hatching with which a virtual machine VM is illustrated have the same meaning as that in FIG. 11. In FIG. 20, the state changes in the order of (A), (B), and (C).

In (A) of FIG. 20, the states of the hosts HOST2 and HOST4 are same as those in (C) of FIG. 18. The virtual machines VM1-1, VM1-2, VM1-3, and VM1-4 are migrated to the hosts HOST3 and HOST4 by the load balance method, and maintenance is started at the host HOST1. The new virtual machine VM1 is deployed by the load balance method during the maintenance of the host HOST1. The virtual machine VM1 is deployed at the host HOST3, the actually available resource amount of which is largest.

In (B) of FIG. 20, the new virtual machines VM2 and VM3 are sequentially deployed based on actually available resource amounts by the load balance method. The virtual machine VM2 is deployed at the host HOST4, the actually available resource amount of which is largest among the host HOST2 to HOST4 at which deployment is possible. Subsequently, the virtual machine VM3 is deployed at the host HOST2, the actually available resource amount of which is largest among the host HOST2 to HOST4 at which deployment is possible. The maintenance of the host HOST1 is completed in (B) of FIG. 20, and the processing of returning the virtual machines VM1-1, VM1-2, VM1-3, and VM1-4 to the migration source host HOST1 is executed in (C) of FIG. 20.

In (C) of FIG. 20, variance occurs in the provisionally available resource amounts of the deployment destination hosts HOST2 to HOST4 after the virtual machines VM1-1, VM1-2, VM1-3, and VM1-4 are returned to the migration source host HOST1. In other words, similarly to FIG. 15, when each virtual machine VM has been migrated from the host HOST1 by the load balance method, variance potentially occurs in the available resource amounts of hosts HOST at which deployment is possible after the virtual machine VM is returned to the migration source host HOST1. As a result, it is difficult to equalize loads on the hosts HOST at which deployment is possible after the virtual machine VM is returned to the migration source host HOST1.

Accordingly, similarly to the above-described embodiments, in the embodiment illustrated in FIGS. 16 to 19, after a virtual machine VM is returned to the migration source host HOST1, the available resource amounts of hosts HOST are equalized, and loads on the hosts HOST are equalized. When a host HOST at which a virtual machine VM is to be deployed is determined based on provisionally available resource amounts, it is possible to avoid overcommitment by avoiding deployment of the virtual machine VM at a host HOST, the actually available resource amount of which is insufficient.

In addition, in the embodiment illustrated in FIGS. 16 to 19, when virtual machines VM are migrated and deployed by the load balance method, the available resource amounts of hosts 10 are equalized after the virtual machines VM are returned to the migration source host 10. In other words, when a new virtual machine VM is deployed at a host HOST, the provisionally available resource amount of which is largest and at which deployment is possible, loads on hosts HOST at which deployment is possible are equalized after each virtual machine VM is returned to the migration source host HOST1.

Figure 21:
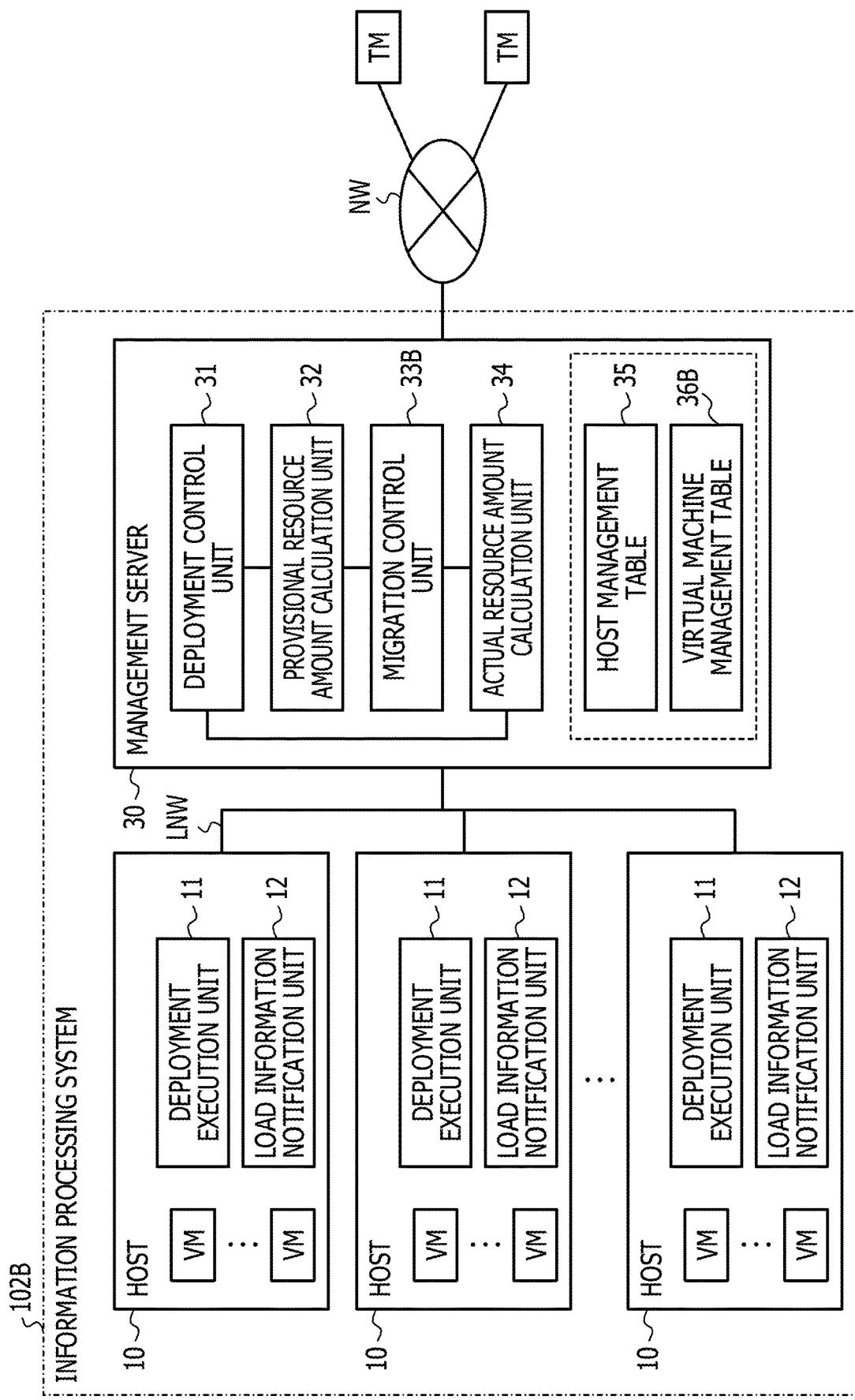
FIG. 21 is a diagram illustrating an information processing device, an information processing system, and an information processing method according to another embodiment.

FIG. 21 illustrates an information processing device, an information processing system, and an information processing method according to another embodiment. Any component identical or equivalent to that illustrated in FIG. 3 is denoted by an identical reference sign, and detailed description thereof will be omitted. An information processing system 102B illustrated in FIG. 21 includes a migration control unit 33B and a virtual machine management table 36B in place of the migration control unit 33 and the virtual machine management table 36 illustrated in FIG. 3. The other configuration of the information processing system 102B is same as that of the information processing system 102 illustrated in FIG. 3. The migration control unit 33B selects, in the ascending order of resource amount, virtual machines VM to be migrated from a host 10 at which maintenance or the like is performed to another host 10, and migrates the selected virtual machines VM by the stuffing method. FIG. 22 illustrates an exemplary virtual machine management table 36B.

FIG. 22 illustrates examples of the host management table 35 and the virtual machine management table 36B illustrated in FIG. 21. The states of the host management table 35 and the virtual machine management table 36B illustrated in FIG. 21 correspond to the state in (A) of FIG. 24 to be described later. Similarly to the host management table 35 illustrated in FIG. 5, the host management table 35 includes a plurality of row regions each storing a host name, an actually available resource amount, a provisionally available resource amount, and a maintenance flag.

The virtual machine management table 36B includes a region storing a migration preferential order in addition to the regions storing a host name, a virtual machine name, a resource amount, a migration flag, and a migration source host name in the virtual machine management table 36 illustrated in FIG. 5. The migration preferential order indicates an order at which the corresponding virtual machine VM is migrated from the host HOST1 to another host HOST. For example, the migration control unit 33B refers to migration preferential orders illustrated in FIG. 22, and migrates the virtual machines VM1-4, VM1-5, VM1-3, VM1-2, and VM1-1 to another host HOST in the ascending order of migration preferential order. Virtual machines VM having the same migration preferential order may be migrated in any order. In FIG. 22, any one of the migration preferential orders of the virtual machines VM1-4 and VM1-5 having the same resource amount may be set to "2".

For example, the management server 30 sets, to the virtual machine management table 36B, migration preferential orders together with migration flags and migration source host names before any virtual machine VM is migrated from the host HOST1 at which maintenance or the like is performed. The management server 30 sets the migration preferential orders in the ascending order of resource amount based on resource amounts held in the virtual machine management table 36B.

The migration flag of a row region storing a migration preferential order may be regarded as "1", thereby using the migration preferential order as the migration flag. In this case, the virtual machine management table 36B does not have to include a migration flag, and the management server 30 sets migration preferential orders together with migration source host names to the virtual machine management table 36B before a virtual machine VM is migrated from the host HOST1 at which maintenance or the like is performed.

Figure 23:
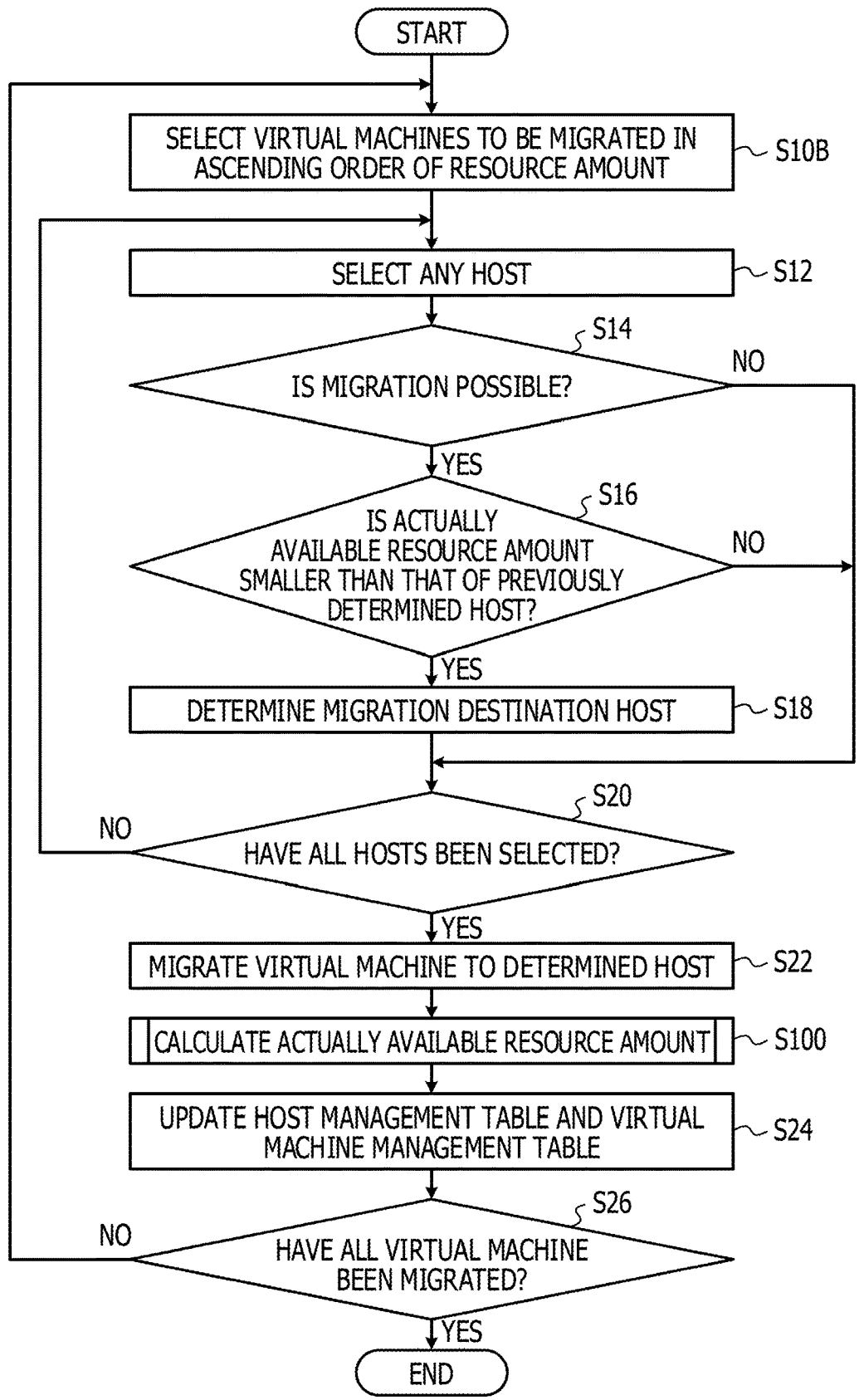
FIG. 23 is a diagram illustrating an exemplary operation of migrating a virtual machine in a management server illustrated in FIG. 21.

FIG. 23 illustrates an exemplary operation executed by the management server 30 illustrated in FIG. 21 to migrate a virtual machine VM. In other words, FIG. 23 illustrates an exemplary information processing method performed by the management server 30. Any processing identical or equivalent to that in FIG. 6 is denoted by an identical reference sign, and detailed description thereof will be omitted. In FIG. 23, step S10B is executed in place of step S10 illustrated in FIG. 6. The other processing in FIG. 23 is same as that in FIG. 6. Similarly to FIG. 6, the operation illustrated in FIG. 23 is executed by the migration control unit 33B, for example, before maintenance is performed at any host 10 included in the information processing system 102B. The operation of the deployment control unit 31 is same as that in FIG. 7, and an operation executed by the migration control unit 33B to return a virtual machine VM to the migration source host 10 is same as that in FIG. 8.

At step S10B, the migration control unit 33B selects virtual machines VM to be migrated in the ascending order of resource amount by referring to the migration preferential order regions in the virtual machine management table 36B. Then, the migration control unit 33B executes the processing at step S12 and later. Alternatively, at step S10B, the migration control unit 33B may select virtual machines VM to be migrated in the ascending order of resource amount without using the migration preferential orders by comparing resource amounts in row regions in each of which the migration flag is "1" in the virtual machine management table 36 illustrated in FIG. 5.

Figure 24:
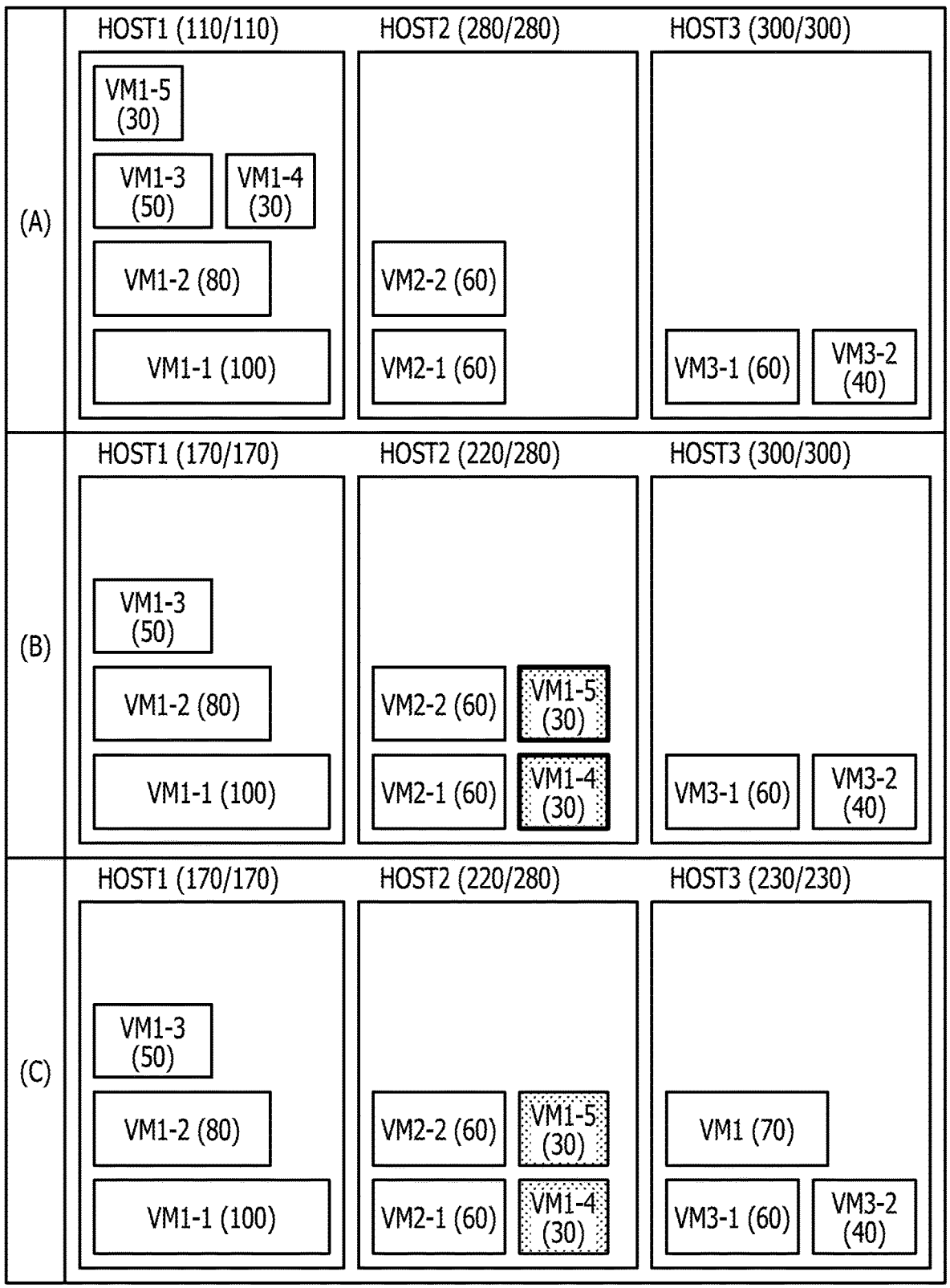
FIG. 24 is a diagram illustrating an exemplary operation of the information processing system illustrated in FIG. 21.
Figure 25:
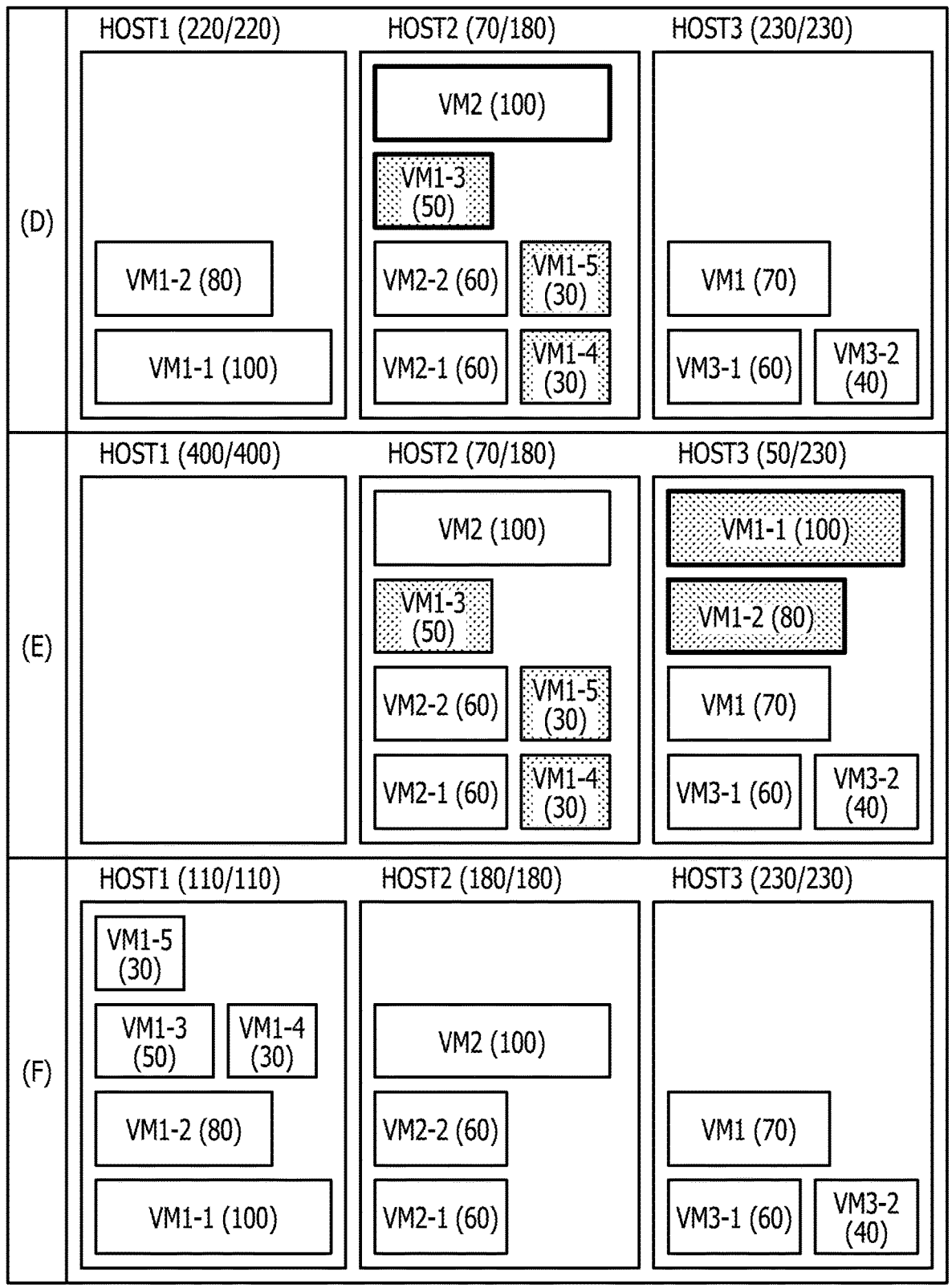
FIG. 25 is a diagram illustrating continuation of the operation illustrated in FIG. 24.

FIGS. 24 and 25 illustrate an exemplary operation of the information processing system 102B illustrated in FIG. 21. Similarly to FIG. 11, each host 10 is indicated by a host name such as HOST1, and each virtual machine VM is indicated by a virtual machine name such as VM1-1. A number in parentheses attached to each virtual machine VM indicates the amount of resources used for the virtual machine VM. Each virtual machine VM illustrated with a bold frame indicates that the deployment destination thereof is changed from that in the previous state. Each virtual machine VM illustrated with hatching indicates that the virtual machine VM is migrated from the host HOST1 to another host HOST. In FIGS. 24 and 25, the state changes in the order of (A), (B), (C), (D), (E), and (F).

Among two numbers in parentheses right to each host name, the left number indicates an actually available resource amount, and the right number indicates a provisionally available resource amount. The host HOST1 is the migration source of virtual machines VM, and thus similarly to the description with reference to FIG. 12, the actually available resource amount and the provisionally available resource amount thereof illustrated in (B) and (C) of FIG. 24 are not reflected on the host management table 35 illustrated in FIG. 22.

In (A) of FIG. 24, which indicates the states of the host management table 35 and the virtual machine management table 36B illustrated in FIG. 22, virtual machines VM are deployed at three hosts HOST (HOST1 to HOST3). As indicated by maintenance flags and migration flags illustrated in FIG. 22, virtual machines VM deployed at the host HOST1 are migrated to other hosts HOST when maintenance is to be performed at the host HOST1.

In (B) of FIG. 24, the migration control unit 33B sequentially migrates the virtual machines VM1-4 and VM1-5 to the host HOST2, the actually available resource amount of which is smallest, in the ascending order of resource amount by the stuffing method in accordance with the process illustrated in FIG. 23. The actually available resource amount of the host HOST2 is "220" after the virtual machines VM1-4 and VM1-5 are migrated. The provisionally available resource amount of the host HOST2 is not changed at "280".

In (C) of FIG. 24, the management server 30 receives a request for deployment of the new virtual machine VM1 during migration of the virtual machines VM from the host HOST1. The deployment control unit 31 deploys the virtual machine VM1 at the host HOST3, the provisionally available resource amount of which is largest among the hosts HOST2 and HOST3 at which deployment is possible by the load balance method in accordance with the process illustrated in FIG. 7. The actually available resource amount and the provisionally available resource amount of the host HOST3 each become "230" through the deployment of the virtual machine VM1.

In (D) of FIG. 25, the migration control unit 33B migrates the virtual machine VM1-3, the resource amount of which is next smaller than those of the virtual machines VM1-4 and VM1-5 to the host HOST2, the actually available resource amount of which is smallest among the hosts HOST2 and HOST3 at which deployment is possible. Subsequently, the management server 30 receives a request for deployment of the new virtual machine VM2 during the migration of the virtual machines VM from the host HOST1. The deployment control unit 31 deploys the virtual machine VM2 at the host HOST2, the provisionally available resource amount of which is largest among the hosts HOST2 and HOST3 at which deployment is possible. The actually available resource amount of the host HOST2 becomes "70" and the provisionally available resource amount becomes "180" through the migration of the virtual machine VM1-3 and the deployment of the virtual machine VM2.

When the migration of the virtual machines VM due to maintenance or the like is executed by the stuffing method in the ascending order of resource amount, fragmentation of a memory region or the like used for virtual machines VM is avoided at, for example, the host HOST2. Accordingly, some amount of actually available resources are obtained at the host HOST2, and thus a virtual machine VM, the resource amount of which is large is deployed at a higher probability than a conventional case.

In (E) of FIG. 25, the migration control unit 33B sequentially migrates the virtual machines VM1-2 and VM1-1, the resource amounts of which are next smaller to the host HOST3 to which migration is possible. The actually available resource amount of the host HOST3 becomes "50" through the migration of the virtual machines VM1-2 and VM1-1. The provisionally available resource amount of the host HOST3 is not changed at "230". The maintenance of the host HOST1 is completed in (E) of FIG. 25, and the processing of returning the virtual machines VM1-1, VM1-2, VM1-3, VM1-4, and VM1-5 to the migration source host HOST1 is executed in (F) of FIG. 25.

In (F) of FIG. 25 after the virtual machines VM1-1, VM1-2, VM1-3, VM1-4, and VM1-5 are returned to the host HOST1, the actually available resource amounts (provisionally available resource amounts) of the deployment destination hosts HOST2 and HOST3 are different from each other by "50". Accordingly, when the migration of the virtual machines VM due to maintenance or the like is executed by the stuffing method in the ascending order of resource amount, the available resource amounts of hosts HOST at which deployment is possible are equalized after each virtual machine VM is returned to the migration source host HOST1. Thus, when new virtual machines VM are deployed by the load balance method, loads on hosts HOST at which deployment is possible are equalized without being affected by fragmentation or the like of the resources of the hosts HOST after each virtual machine VM is returned to the migration source host HOST1.

Figure 26:
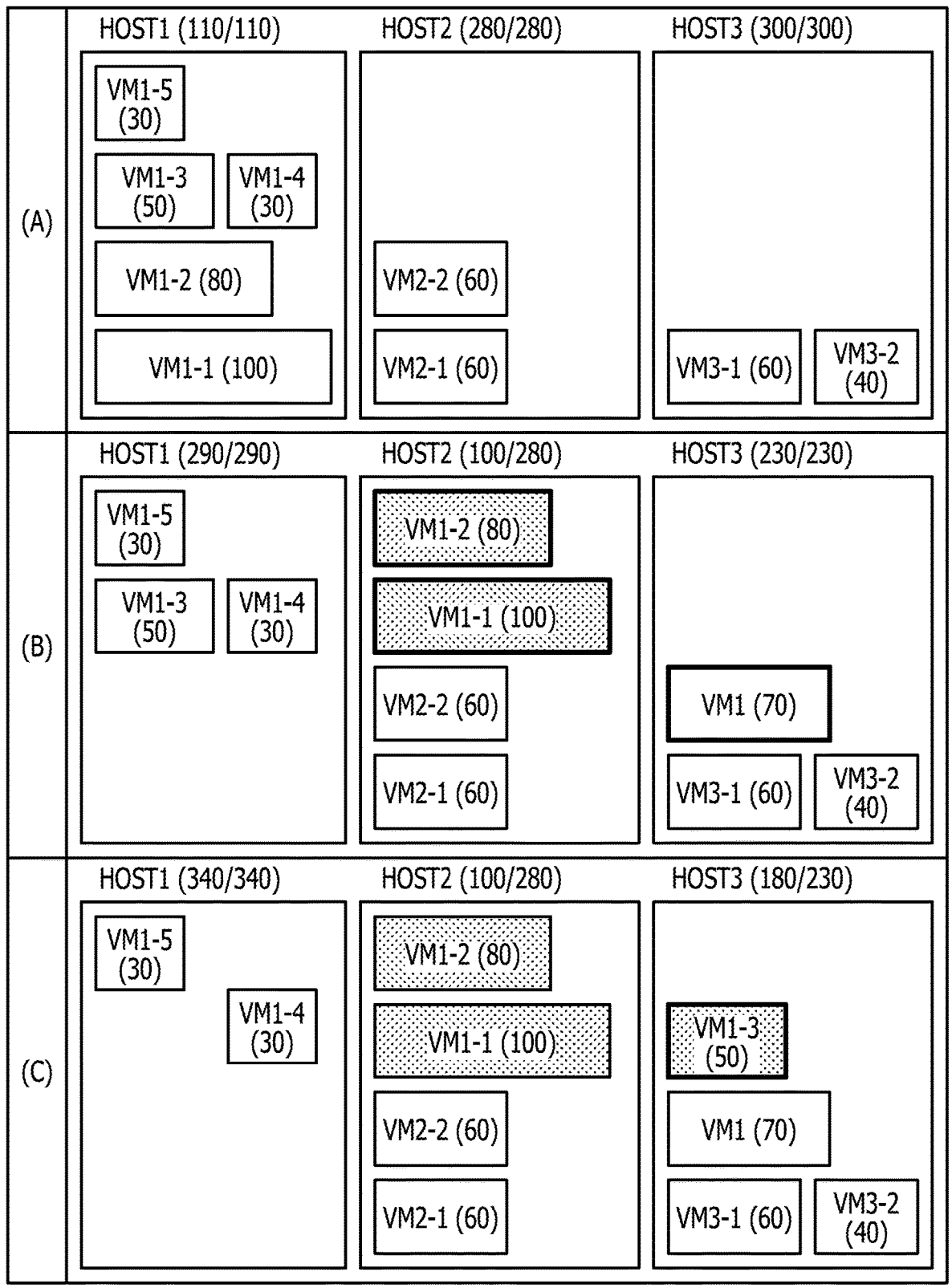
FIG. 26 is a diagram illustrating an exemplary operation of another information processing system including a management server configured to migrate a virtual machine without consideration on the volume of a resource amount.
Figure 27:
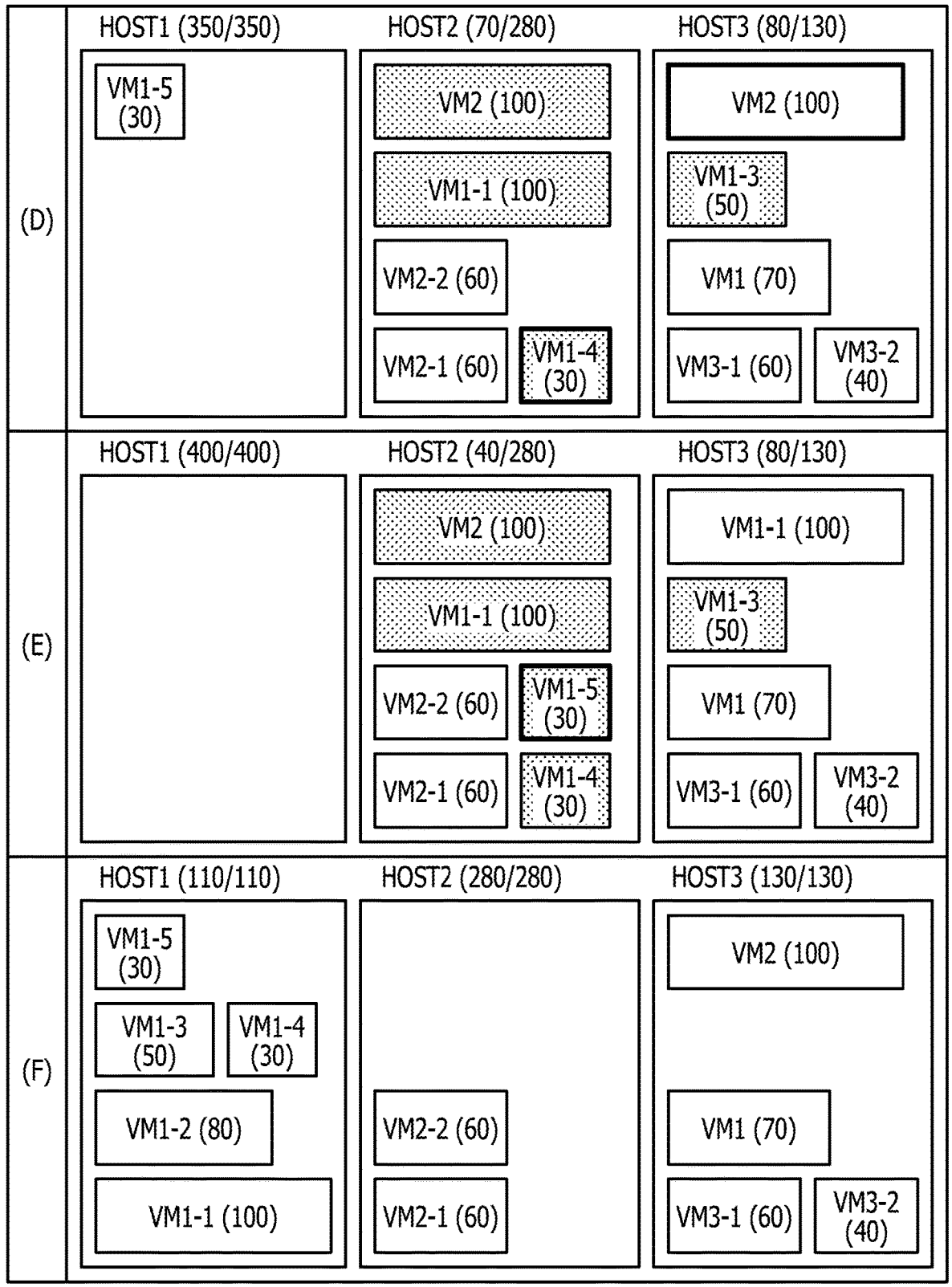
FIG. 27 is a diagram illustrating continuation of the operation illustrated in FIG. 26.

FIGS. 26 and 27 illustrate an exemplary operation of another information processing system including a management server configured to migrate a virtual machine VM without consideration on the volume of the resource amount thereof. A bold frame and hatching with which a virtual machine VM is illustrated have the same meaning as that in FIG. 11. In FIGS. 26 and 27, the state changes in the order of (A), (B), (C), (D), (E), and (F). In (A) of FIG. 26, the states of the hosts HOST1, HOST2, and HOST3 are same as those in (A) of FIG. 24.

In (B) of FIG. 26, a migration control unit of the management server of the information processing system sequentially migrates virtual machines VM to a host HOST, the actually available resource amount of which is smallest by the stuffing method, for example, in descending order of resource amount. In the example illustrated in FIG. 26, the virtual machines VM1-1 and VM1-2 are sequentially migrated from the host HOST1 to the host HOST2. Since the virtual machines VM1-1 and VM1-2, which use resource amounts larger than those of the other virtual machines VM, are migrated to the host HOST2, fragmentation is likely to occur to the resources of the host HOST2. Depending on the state of fragmentation, new virtual machines VM are potentially not deployed in a distributed manner by the load balance method.

In (C) of FIG. 26, the migration control unit migrates the virtual machine VM1-3, the resource amount of which is next larger to the host HOST3 at which deployment is possible among the hosts HOST2 and HOST3 by the stuffing method. In (B) of FIG. 26, the provisionally available resource amount (100) of the host HOST2 is smaller than the provisionally available resource amount (230) of the host HOST3. However, the host HOST2 is unable to prepare resources for migration of the virtual machine VM1-3 due to fragmentation, and thus the virtual machine VM1-3 is migrated to the host HOST3.

In (D) of FIG. 27, the migration control unit migrates the virtual machine VM1-4, the resource amount of which is next larger to the host HOST2, the actually available resource amount of which is smallest among the hosts HOST2 and HOST3 at which deployment is possible by the stuffing method. Subsequently, the management server of the information processing system receives a request for deployment of the new virtual machine VM2 during migration of the virtual machine VM from the host HOST1. A deployment control unit of the management server of the information processing system deploys the virtual machine VM2 at the host HOST3, the provisionally available resource amount of which is largest and at which deployment is possible.

In (E) of FIG. 27, the migration control unit migrates the remaining virtual machine VM1-3 to the host HOST2, the actually available resource amount of which is smallest among the hosts HOST2 and HOST3 by the stuffing method. The maintenance of the host HOST1 is completed in (E) of FIG. 27, and the processing of returning the virtual machines VM1-1, VM1-2, VM1-3, VM1-4, and VM1-5 to the migration source host HOST1 is executed in (F) of FIG. 27.

In (F) of FIG. 27 after the virtual machines VM1-1, VM1-2, VM1-3, VM1-4, and VM1-5 are returned to the host HOST1, the actually available resource amounts (provisionally available resource amounts) of the deployment destination hosts HOST2 and HOST3 are different from each other by "150". Accordingly, when migration of the virtual machines VM is not executed by the stuffing method in the ascending order of resource amount, variance occurs in the available resource amounts of hosts HOST at which deployment is possible after the virtual machines VM are returned to the migration source host HOST1. In addition, when resource fragmentation occurs at a host HOST, the number of hosts HOST at which virtual machines VM are to be deployed decreases, and accordingly, loads on hosts HOST at which deployment is possible are unlikely to be equalized after the virtual machines VM are returned to the migration source host HOST1.

Accordingly, similarly to the above-described embodiments, in the embodiment illustrated in FIGS. 21 to 27, after virtual machines VM are returned to the migration source host HOST1, the available resource amounts of hosts HOST are equalized, and loads on the hosts HOST are equalized.

In addition, in the embodiment illustrated in FIGS. 21 to 27, since virtual machines VM are migrated by the stuffing method in the ascending order of resource amount, fragmentation of a memory region or the like used for the virtual machines VM is avoided at a host HOST as the migration destination. Accordingly, when new virtual machines VM are deployed by the load balance method, loads on hosts HOST at which deployment is possible are equalized without being affected by fragmentation or the like of the resources of the hosts HOST after each virtual machine VM is returned to the migration source host HOST1. In addition, some amount of actually available resources are obtained at each host HOST as the migration destination of the virtual machines VM, and thus a virtual machine VM, the resource amount of which is large is deployed at a higher probability than a conventional case.

The features and advantages of the embodiments may be clarified through the above detailed description. The claims include the features and advantages of embodiments as described above without departing from the spirit and scope thereof. Various modifications and changes of the present disclosure may be easily thought of by a person with ordinary skill in the art. Thus, the range of inventive embodiments is not intended to be limited to those described above but may include appropriate modifications and equivalents in a range disclosed in the above-described embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A virtual machine management device comprising:
one or more memories; and
one or more processors coupled to one or more memories and the one or more processors configured to:
calculate, for each of a plurality of hosts, a first amount of resources including both first resources allocated to a virtual machine migrated from a migration source and second resources available for a new virtual machine,
store a first amount of resources in a memory among the one or more memories,
perform selection of a first host from among the plurality of hosts in accordance with the stored first amount, and
deploy a first new virtual machine transferred from a target host on which maintenance is started in the first host,
when the maintenance of the target host is completed, return the first new virtual machine to the target host,
calculate, for each of a plurality of hosts excluding the first host, a second amount of resources including second resources allocated to a virtual machine migrated from a migration source, and
update, in the memory, the first amount of resources to the second amount of resources.

2. The virtual machine management device according to claim 1, wherein the first amount regarding the first host is largest among the plurality of hosts.

3. The virtual machine management device according to claim 1, wherein the one or more processors are configured to:
calculate, for each of the plurality of hosts, a second amount of the second resources available for a new virtual machine, and
migrate a first virtual machine deployed at a second host to a third host among the plurality of hosts in accordance with the calculated second amount.

4. The virtual machine management device according to claim 3, wherein the second amount regarding the third host is smallest among the plurality of hosts.

5. The virtual machine management device according to claim 3, wherein the one or more processors are configured to preferentially migrate, to the third host, a virtual machine that uses a smallest resource amount among a plurality of virtual machines including the first virtual machine.

6. The virtual machine management device according to claim 3, wherein the second amount regarding the third host is largest among the plurality of hosts.

7. The virtual machine management device according to claim 1, wherein the selection includes selecting, from among the plurality of hosts, in accordance with the calculated first amount, the first host having a resource amount of the second resources larger than a resource amount of resources used by the first new virtual machine.

8. The virtual machine management device according to claim 3, wherein the one or more processors are configured to update the second amount regarding the first host after the first new virtual machine is deployed.

9. The virtual machine management device according to claim 3, wherein the one or more processors are configured to:
return the first virtual machine from the third host to the second host in response to receiving a request, and
update the second amount of the second resources regarding the third host after the first virtual machine returns to the second host.

10. A virtual machine management method executed by a computing system, the virtual machine management method comprising:
calculating, for each of a plurality of hosts, a first amount of resources including both first resources allocated to a virtual machine migrated from a migration source and second resources available for a new virtual machine;
storing a first amount of resources in a memory;
selecting a first host from among the plurality of hosts in accordance with the stored first amount; and
deploying a first new virtual machine transferred from a target host on which maintenance is started in the first host,
when the maintenance of the target host is completed, returning the first new virtual machine to the target host;
calculating, for each of a plurality of hosts excluding the first host, a second amount of resources including second resources allocated to a virtual machine migrated from a migration source; and
updating, in the memory, the first amount of resources to the second amount of resources.

11. The virtual machine management method according to claim 10, wherein the first amount regarding the first host is largest among the plurality of hosts.

12. The virtual machine management method according to claim 10, further comprising:
- calculating, for each of the plurality of hosts, a second amount of the second resources available for a new virtual machine; and
- migrating a first virtual machine deployed at a second host to a third host among the plurality of hosts in accordance with the calculated second amount.

13. The virtual machine management method according to claim 12, wherein the second amount regarding the third host is smallest among the plurality of hosts.

14. A non-transitory computer-readable medium storing instructions executable by a computer, the instructions comprising:
- one or more instructions for calculating, for each of a plurality of hosts, a first amount of resources including both first resources allocated to a virtual machine migrated from a migration source and second resources available for a new virtual machine;
- one or more instructions for storing a first amount of resources in a memory;
- one or more instructions for selecting a first host from among the plurality of hosts in accordance with the stored first amount; and
- one or more instructions for deploying a first new virtual machine transferred from a target host on which maintenance is started in the first host,
- when the maintenance of the target host is completed, one or more instructions for returning the first new virtual machine to the target host;
- one or more instructions for calculating, for each of a plurality of hosts excluding the first host, a second amount of resources including second resources allocated to a virtual machine migrated from a migration source; and
- one or more instructions for updating, in the memory, the first amount of resources to the second amount of resources.

* * * * *